US012674494B2

(12) United States Patent　(10) Patent No.:　US 12,674,494 B2
Yamamoto et al.　(45) Date of Patent:　Jul. 7, 2026

(54) ELECTRIC FRICTION ENGAGEMENT DEVICE, METHOD FOR DETECTING TOUCH POINT THEREFOR, AND METHOD FOR DETECTING ABNORMALITY THEREOF

(71) Applicant: NSK LTD., Tokyo (JP)

(72) Inventors: Akihiro Yamamoto, Fujisawa (JP); Shingo Kimura, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/881,479

(22) PCT Filed: Jul. 3, 2023

(86) PCT No.: PCT/JP2023/024660
§ 371 (c)(1),
(2) Date: Jan. 6, 2025

(87) PCT Pub. No.: WO2024/014343
PCT Pub. Date: Jan. 18, 2024

(65) Prior Publication Data
US 2026/0009431 A1　Jan. 8, 2026

(30) Foreign Application Priority Data

Jul. 13, 2022　(JP) ................................ 2022-112379

(51) Int. Cl.
*F16D 48/08*　(2006.01)
*F16D 13/52*　(2006.01)
*F16D 23/12*　(2006.01)
(52) U.S. Cl.
CPC ............. *F16D 48/08* (2013.01); *F16D 13/52* (2013.01); *F16D 23/12* (2013.01);
(Continued)

(58) Field of Classification Search
CPC .... F16D 48/08; F16D 13/52; F16D 2023/123; F16D 2500/1045; F16D 2500/1023; F16D 2500/5012
See application file for complete search history.

(56) References Cited

U.S. PATENT DOCUMENTS 11,242,898 B2 * 2/2022 Sugiura ................... F16H 25/18
11,867,237 B2 * 1/2024 Sugiura ................... F16D 23/12
(Continued)

FOREIGN PATENT DOCUMENTS

JP　　2000-170789 A　　6/2000
JP　　2008-008383 A　　1/2008
(Continued)

OTHER PUBLICATIONS

International Search Report issued Aug. 22, 2023 in International Application No. PCT/JP2023/024660.
(Continued)

*Primary Examiner* — Huan Le
(74) *Attorney, Agent, or Firm* — Sughrue Mion, PLLC

(57) ABSTRACT

The electric friction engagement device has a function of detecting a phase in a rotational direction of a drive cam when an output torque or current value of a shift motor begins to increase at a rate of increase equal to or greater than a first threshold value as a piston touch point and a function of detecting a phase in the rotational direction of the drive cam when the rate of increase becomes equal to or less than a second threshold value after exceeding the piston touch point as a clutch touch point.

7 Claims, 18 Drawing Sheets

(52) U.S. Cl.
CPC ................. *F16D 2023/123* (2013.01); *F16D 2500/10412* (2013.01); *F16D 2500/1045* (2013.01)

(56) References Cited

U.S. PATENT DOCUMENTS

| | | | |
|---|---|---|---|
| 2012/0298466 | A1 | 11/2012 | Nedachi et al. |
| 2022/0373043 | A1* | 11/2022 | Dourra ................... F16D 48/06 |
| 2023/0050408 | A1* | 2/2023 | Kujak ................ F01L 1/34403 |

FOREIGN PATENT DOCUMENTS

| | | |
|---|---|---|
| JP | 2018-189207 A | 11/2018 |
| WO | 2008/096438 A1 | 8/2008 |
| WO | 2011/096540 A1 | 11/2011 |
| WO | 2022/209634 A1 | 10/2022 |

OTHER PUBLICATIONS

Communication dated Feb. 10, 2026 in Japanese Application No. 2024-533651.

\* cited by examiner

ELECTRIC FRICTION ENGAGEMENT DEVICE, METHOD FOR DETECTING TOUCH POINT THEREFOR, AND METHOD FOR DETECTING ABNORMALITY THEREOF

CROSS-REFERENCE TO RELATED APPLICATIONS

This is a National Stage of International Application No. PCT/JP2023/024660 filed Jul. 3, 2023, claiming priority based on Japanese Patent Application No. 2022-112379 filed Jul. 13, 2022.

TECHNICAL FIELD

The present disclosure relates to an electric friction engagement device that uses a shift motor as a drive source and switches between a connected mode in which torque is transmitted between a first member and a second member and a disconnected mode in which torque is not transmitted therebetween.

BACKGROUND ART

In rotary mechanical devices such as automobiles and machine tools, a transmission is provided between a power source such as an engine or an electric motor and a driven object in order to efficiently utilize the output of the power source. When a gear-type stepped transmission is used, a clutch device is installed between the power source and the transmission to switch between a connected mode in which the output torque of the power source can be transmitted to the transmission, and a disconnected mode in which the output torque cannot be transmitted thereto. Examples of such clutch devices include a friction clutch that transmits power through friction between opposing friction surfaces, and a claw clutch that transmits power through claws meshing with each other.

The friction clutch can switch between a connected mode in which torque is transmitted between a pair of rotating members arranged coaxially with each other and a disconnected mode in which torque is not transmitted between the pair of rotating members, regardless of the phase difference or rotational speed difference between the pair of rotating members.

WO 2008/096438 A1 describes a normally open type friction clutch that uses a motor as a drive source and switches between a disconnected mode and a connected mode.

To switch the friction clutch described in WO 2008/096438 A1 to the connected mode, a first cam plate is rotated and driven in one circumferential direction by a motor through a reducer and a transmission mechanism, and the first cam plate is separated from a second cam plate, thereby pressing a moving member against the elastic force of a return spring. This causes a drive plate and a driven plate to press against each other.

On the other hand, to switch the friction clutch to the disconnected mode, the first cam plate is rotated and driven in the other circumferential direction by the motor through the reducer and the transmission mechanism, and the first cam plate and the second cam plate are brought closer to each other, thereby releasing the force pressing the drive plate and the driven plate against each other. As a result, the action of the return spring widens the distance between the drive plate and the driven plate.

CITATION LIST

Patent Literature

Patent Literature 1: WO 2008/096438 A1

SUMMARY OF INVENTION

Technical Problem

In the friction clutch described in WO 2008/096438 A1, in a state where the drive plate and driven plate wear, when switching friction clutch from the connected mode to the disconnected mode, the piston touch point in which the phase in the rotational direction of the first cam plate when the fastening force of the friction clutch begins to decrease, and the clutch touch point in which the phase in the rotational direction of the first cam plate when the fastening force becomes zero, change. Therefore, in order to ensure good controllability of the friction clutch, it is desired to precisely detect the piston touch point and the clutch touch point.

In addition, when the drive plate and the driven plate are used until their wear exceeds their respective limit of use, this may induce breakdown such as seizure. Therefore, from the aspect of ensuring reliability of the friction clutch, it is desired to precisely detect the piston touch point and the clutch touch point.

In view of the circumstances described above, an object according to the present disclosure is to achieve an electric friction engagement device capable of detecting the piston touch point and the clutch touch point.

Solution to Problem

An electric friction engagement device according to an aspect of the present disclosure includes a first member, a second member, a friction engagement portion, an elastic biasing member, a cam device, and an electric actuator.

The second member is supported coaxially with the first member and supported so as to be capable of rotating relative to the first member.

The friction engagement portion has at least one first friction plate and at least one second friction plate supported to be capable of relative displacement in an axial direction, and is provided between the first member and the second member. The friction engagement portion switches to a state in which torque is transmitted between the first member and the second member by pressing the first friction plate and the second friction plate against each other, and switches to a state in which torque is not transmitted between the first member and the second member by releasing the force pressing the first friction plate and the second friction plate against each other.

The elastic biasing member is provided between the first member and the friction engagement portion, and elastically biases the first friction plate and the second friction plate in a direction of pressing the first friction plate and the second friction plate against each other.

The cam device has a drive cam supported so as to be capable of rotating relative to the first member and the second member but not to be capable of displacement in the axial direction, and a driven cam supported so as to be capable of rotating relative to the drive cam and to be capable of displacement in the axial direction. As the drive cam rotates, the cam device presses the elastic biasing member in a direction of releasing the force pressing the first friction plate and the second friction plate against each other based on the driven cam moving in a direction of widening a distance in the axial direction between the driven cam and the drive cam.

The electric actuator has a shift motor and a reducer, and the drive cam is rotated and driven by the shift motor through the reducer.

The electric friction engagement device according to an aspect of the present disclosure has a function of detecting a phase in a rotational direction (a rotational angle from a reference position) of the drive cam when an output torque or current value of the shift motor begins to increase at a rate of increase equal to or greater than a first threshold value as a piston touch point at which the elastic biasing member begins to be pressed in the direction of releasing the force pressing the first friction plate and the second friction plate against each other when the drive cam is rotated and driven by the shift motor through the reducer in order to switch the friction engagement portion from the state in which torque is transmitted between the first member and the second member to the state in which torque is not transmitted between the first member and the second member.

Furthermore, the electric friction engagement device has a function of detecting a phase in the rotational direction of the drive cam when the rate of increase becomes equal to or less than a second threshold value after exceeding the piston touch point as a clutch touch point at which the force pressing the first friction plate and the second friction plate against each other becomes zero when the drive cam is rotated and driven by the shift motor through the reducer in order to switch the friction engagement portion from the state in which torque is transmitted between the first member and the second member to the state in which torque is not transmitted between the first member and the second member.

The electric friction engagement device according to an aspect of the present disclosure may include a function of determining whether the piston touch point or the clutch touch point is within a predetermined angle range.

The electric friction engagement device according to an aspect of the present disclosure may include a function of determining whether a maximum value of the output torque or current value of the shift motor is within a predetermined range when the drive cam is rotated and driven by the shift motor through the reducer in order to switch the friction engagement portion from the state in which torque is transmitted between the first member and the second member to the state in which torque is not transmitted between the first member and the second member.

In the electric friction engagement device according to an aspect of the present disclosure, the elastic biasing member can have a piston supported so as to be capable of displacement in the axial direction relative to the first member, and an elastic member provided between the first member and the piston.

A method for detecting touch point for the electric friction engagement device according to an aspect of the present disclosure has a step of detecting a phase in a rotational direction of the drive cam when an output torque or current value of the shift motor begins to increase at a rate of increase equal to or greater than a first threshold value as a piston touch point at which the elastic biasing member begins to be pressed in the direction of releasing the force pressing the first friction plate and the second friction plate against each other when the drive cam is rotated and driven by the shift motor through the reducer in order to switch the friction engagement portion from the state in which torque is transmitted between the first member and the second member to the state in which torque is not transmitted between the first member and the second member.

Furthermore, the detecting method has a step of detecting a phase in the rotational direction of the drive cam when the rate of increase becomes equal to or less than a second threshold value after exceeding the piston touch point as a clutch touch point at which the force pressing the first friction plate and the second friction plate against each other becomes zero when the drive cam is rotated and driven by the shift motor through the reducer in order to switch the friction engagement portion from the state in which torque is transmitted between the first member and the second member to the state in which torque is not transmitted between the first member and the second member.

A method for detecting abnormality of the electric friction engagement device according to an aspect of the present disclosure includes:

a step of performing the method for detecting touch point for the electric friction engagement device, and a step of determining whether the piston touch point or the clutch touch point is equal to or greater than a predetermined angle.

The method for detecting abnormality of the electric friction engagement device according to an aspect of the present disclosure may include a step of determining whether a maximum value of the output torque or current value of the shift motor is within a predetermined range when the drive cam is rotated and driven by the shift motor through the reducer in order to switch the friction engagement portion from the state in which torque is transmitted between the first member and the second member to the state in which torque is not transmitted between the first member and the second member.

Effect of Invention

With the electric friction engagement device, the method for detecting touch point therefor, and the method for detecting abnormality thereof, the piston touch point and the clutch touch point can be precisely detected.

DESCRIPTION OF EMBODIMENTS

An electric friction engagement device 7 of an example according to an embodiment of the present disclosure will be described with reference to FIG. 1 to FIG. 18, based on an example in which the electric friction engagement device 7 is incorporated into a two-speed transmission 1 for an automobile. The two-speed transmission 1 is arranged between a drive source 2 such as an electric motor or an engine and a differential device 3, and transmits the output torque to the differential device 3 with increasing the output torque of the drive source, i.e. reducing the rotational speed or without increasing the output torque.

Figure 1:
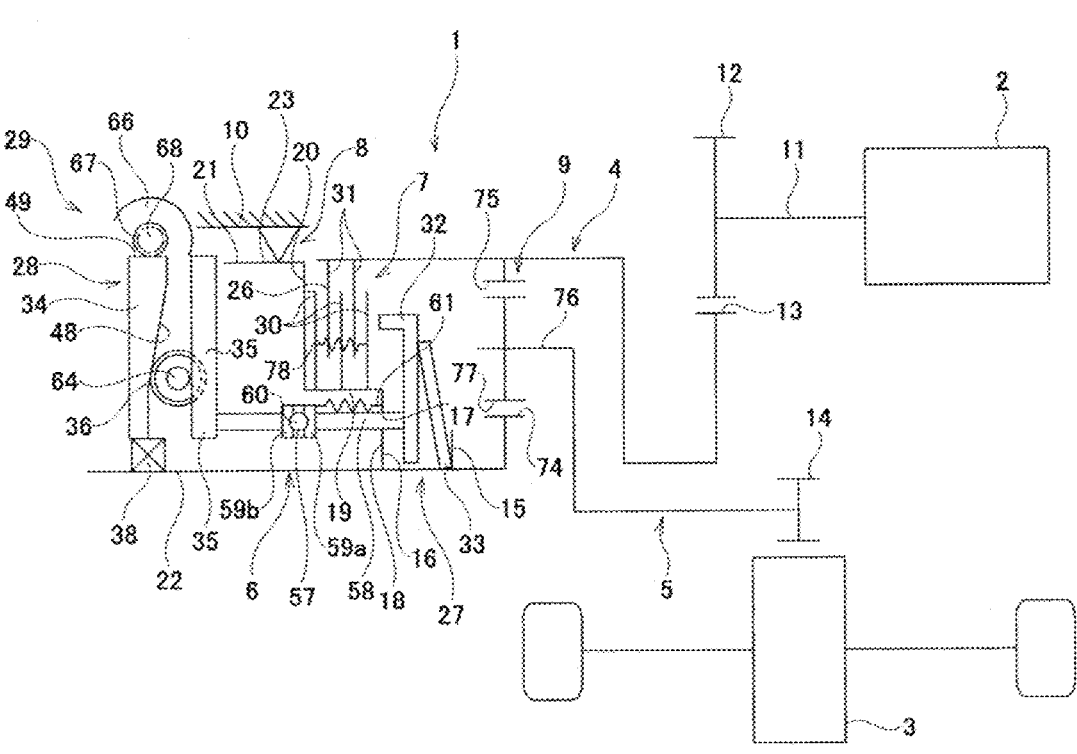
FIG. 1 is a cross-sectional view schematically illustrating a drive system incorporating a two-speed transmission including an electric friction engagement device of an example of an embodiment according to the present disclosure.
Figure 2A:
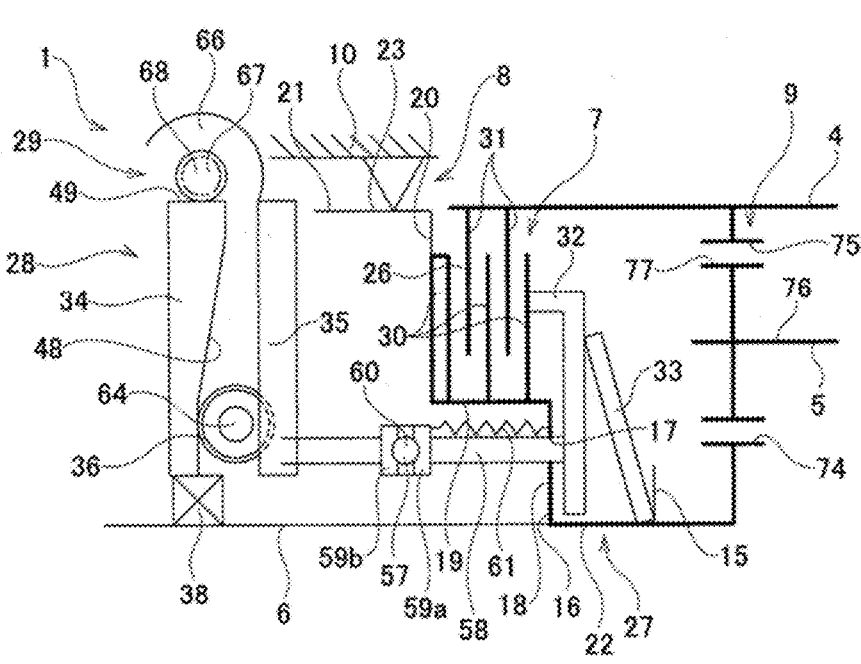
FIG. 2A is a diagram illustrating a torque transmission path in a low reduction ratio mode of the two-speed transmission of the present example.
Figure 2B:
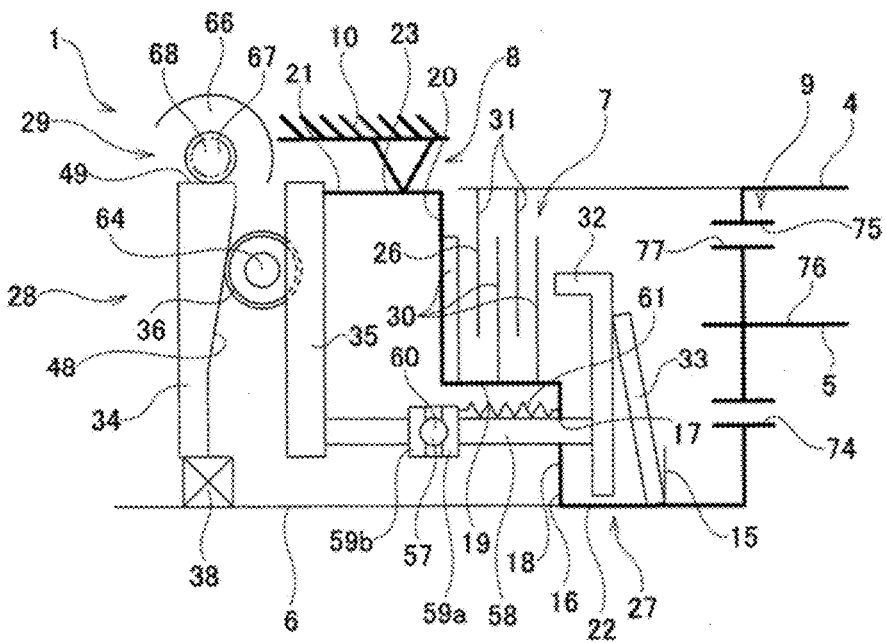
FIG. 2B is a diagram illustrating the torque transmission path in a high reduction ratio mode of the two-speed transmission of the present example.
Figure 3:
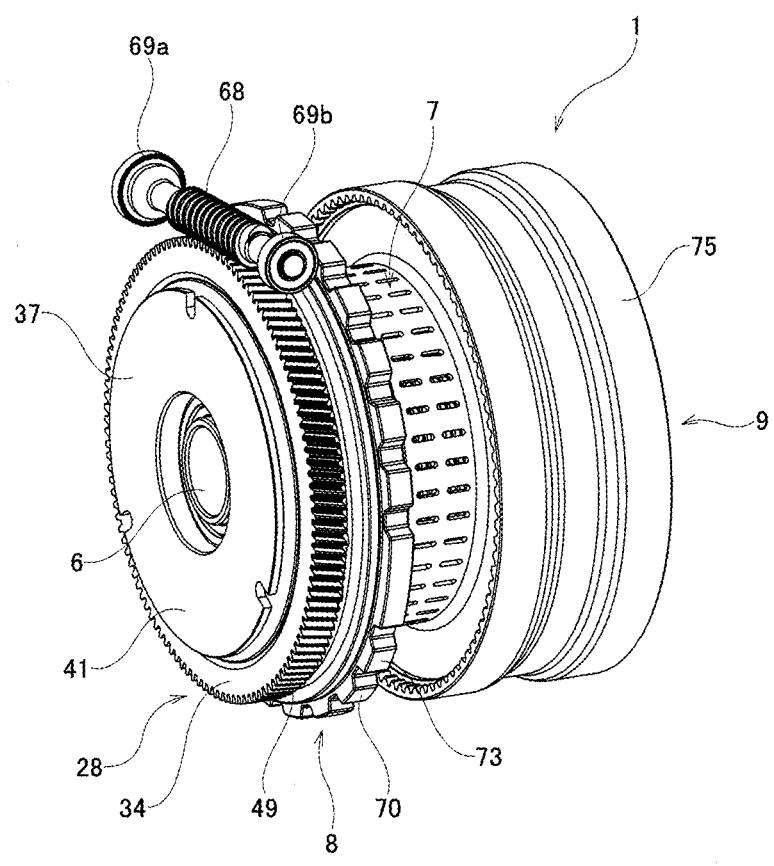
FIG. 3 is a perspective view of the two-speed transmission of the present example.

In order to facilitate understanding of the present disclosure, each element of the drive source 2, the differential device 3, and the two-speed transmission 1 is illustrated schematically in FIGS. 1 to 2B.

The two-speed transmission 1 of the present example includes an input member 4 that can be rotated and driven by the drive source 2, an output member 5 that is connected to the differential device 3 so as to be capable of transmitting toque, and the electric friction engagement device 7.

The electric friction engagement device 7 includes a first member, a second member configured by an input member 4 or connected to the input member 4 so as to be capable of transmitting torque from the input member 4, a friction engagement portion 26, an elastic biasing member 27, a cam device 28, and an electric actuator 29. In the present example, the first member is configured by a rotating member 6. In addition, the second member is configured by the input member 4.

The input member 4 corresponding to the second member is coaxial with the rotating member 6 which is the first member, and is capable of relative rotation with respect to the rotating member 6, which is the first member.

More specifically, the input member 4 is rotatably supported by a fixed portion 10, that is configured by a housing that accommodates the two-speed transmission 1 and does not rotate even during use, through a rolling bearing or the like (not illustrated). In the present example, the input member 4 is configured to be cylindrical (hollow). In addition, the input member 4 also has an input gear 13 at an end portion on one side in the axial direction (the right side in FIG. 1) that engages with a drive gear 12 provided on an output shaft 11 of the drive source 2. That is, the input member 4 can be rotated and driven by the drive source 2.

In the present example, the output member 5 is supported at an inner side in the radial direction of the input member 4 so as to be capable of rotating relative to the input member 4. In addition, the output member 5 has an output gear 14 at an end portion on the one side in the axial direction. The output gear 14 engages with a gear provided at an input portion of the differential device 3. That is, the output member 5 is connected to the input portion of the differential device 3 so as to be capable of transmitting torque.

In the present example, the rotating member 6 corresponding to the first member is supported coaxially with the input member 4 and the output member 5 and supported so as to be capable of rotating relative to the input member 4 and the output member 5. More specifically, the rotating member 6 is rotatably supported by the fixed portion 10 through a brake device 8, a cam device 28, and a radial bearing 38 for rotatably supporting a drive cam 34 of the cam device 28 with respect to the rotating member 6.

In the present example, the rotating member 6 has a small diameter flange portion 15 that protrudes outward in the radial direction at an intermediate portion in the axial direction, and also has a flange portion 16 that protrudes outward in the radial direction at a portion located farther on the other side in the axial direction (the left side in FIG. 1) than the small diameter flange portion 15.

The flange portion 16 has a first circular ring portion 18 having a hollow circular plate shape, a first cylindrical portion 19 bent from an end portion on an outer side in the radial direction of the first circular ring portion 18 toward the other side in the axial direction, a second circular ring portion 20 having a hollow circular plate shape and bent from an end portion on the other side in the axial direction of the first cylindrical portion 19 toward the outer side in the radial direction, and a second cylindrical portion 21 bent from an end portion on the outer side in the radial direction of the second circular ring portion 20 toward the other side in the axial direction. The first circular ring portion 18 has partially arc-shaped through holes 17 at a plurality of positions in an intermediate portion in the radial direction thereof for inserting partial cylindrical portions 63 of a pressing member 58 of the electric friction engagement device 7 therethrough.

Figure 13A:
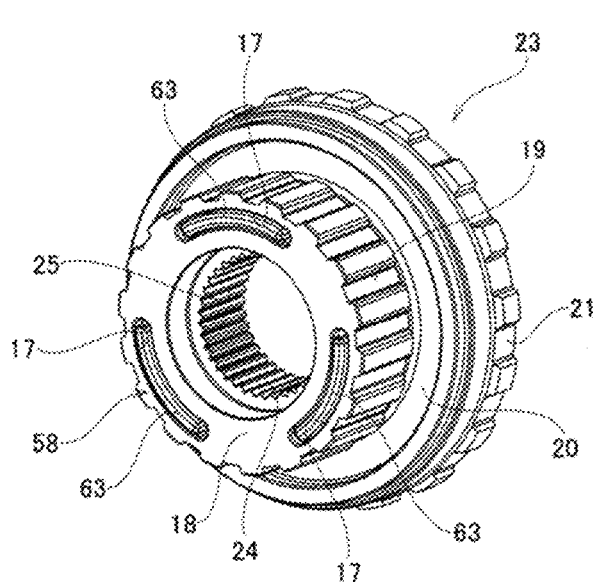
FIG. 13A is a perspective view illustrating a flange portion and a pressing member of a rotating member that is removed from the two-speed transmission of the present example.
Figure 13B:
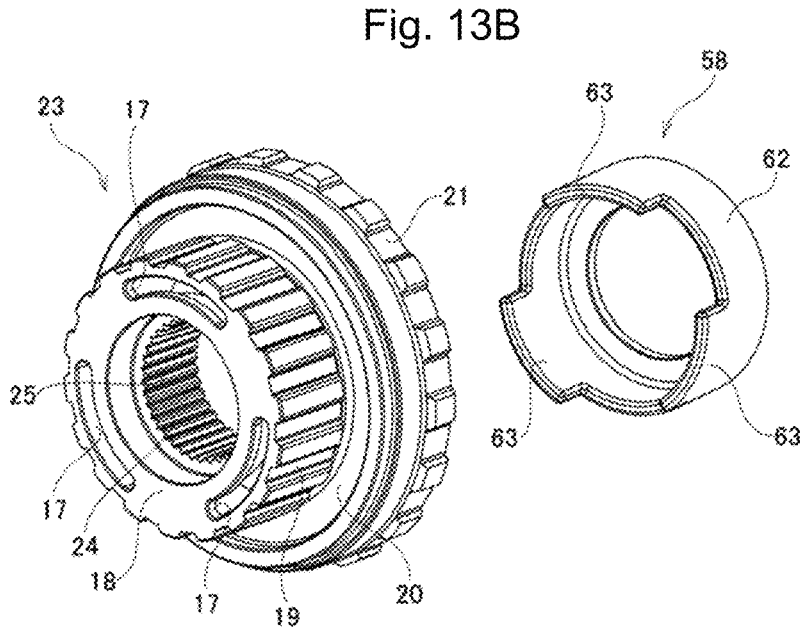
FIG. 13B is an exploded perspective view illustrating the flange portion and the pressing member of the rotating member that is removed from the two-speed transmission.

In the present example, the rotating member 6 is configured by externally fitting and fixing a stepped cylindrical member 23, as illustrated on the left side of FIG. 13B, to a shaft member 22 having a small diameter flange portion 15. That is, the stepped cylindrical member 23 has the first circular ring portion 18, the first cylindrical portion 19, the second circular ring portion 20, the second cylindrical portion 21, and a small diameter cylindrical portion 24 bent from an end portion on the inner side in the radial direction of the first circular ring portion 18 toward the other side in the axial direction. The stepped cylindrical member 23 of the rotating member 6 is supported and fixed by bringing a female spline portion 25 provided on an inner circumferential surface of the small diameter cylindrical portion 24 and a male spline portion provided on an outer circumferential surface of the shaft member 22 into a spline engagement. However, the rotating member may also be configured by joining and fixing the stepped cylindrical member and the shaft member by press fitting, welding, or the like.

In the present example, the electric friction engagement device 7 is provided between the input member 4 and the rotating member 6, and switches between a connected mode in which torque is transmitted between the input member 4 and the rotating member 6, and a disconnected mode in which torque is not transmitted.

The friction engagement portion 26 of the electric friction engagement device 7 has at least one first friction plate 30 and at least one second friction plate 31 that are supported so as to be capable of relative rotation in the axial direction, and is provided between the first member (rotating member 6) and the second member (input member 4).

By pressing the first friction plate 30 and the second friction plate 31 against each other, the friction engagement portion 26 switches to a state in which torque is transmitted between the first member (rotating member 6) and the second member (input member 4), in other words, a state in which the first member (rotating member 6) and the second member (input member 4) rotate integrally. On the other hand, by releasing the force pressing the first friction plate 30 and the second friction plate 31 against each other, the friction engagement portion 26 switches to a state in which no torque is transmitted between the first member (rotating member 6) and the second member (input member 4), in other words, a state in which the first member (rotating member 6) and the second member (input member 4) rotate relative to each other.

In the present example, the friction engagement portion 26 is configured by a multi-plate clutch in which a plurality of first friction plates 30 supported by the rotating member 6 and a plurality of second friction plates 31 supported by the input member 4 are alternately stacked.

The plurality of first friction plates 30 are supported on an outer circumferential surface of the first cylindrical portion 19 so as to be capable of displacement in the axial direction.

The plurality of second friction plates 31 are supported on an inner circumferential surface of an end portion on the other side in the axial direction of the input member 4 so as to be capable of displacement in the axial direction.

The elastic biasing member 27 is provided between the first member (rotating member 6) and the friction engagement portion 26, and elastically biases the first friction plate 30 and the second friction plate 31 in a direction of pressing them against each other. In the present example, the elastic biasing member 27 has a piston 32 and an elastic member 33.

The piston 32 is supported so as to be capable of displacement in the axial direction relative to the rotating member 6. In the present example, the piston 32 is configured as a hollow circular plate shape, and is supported around a portion of the rotating member 6 between the small diameter flange portion 15 and the flange portion 16 in the axial direction so as to be capable of displacement in the axial direction relative to the rotating member 6. In the piston 32, an end surface on the other side in the axial direction of a portion on the outer side in the radial direction faces a surface on the one side in the axial direction of the first friction plate 30 that is located the farthest on the one side in the axial direction of the first friction plate 30.

The elastic member 33 is provided between the rotating member 6 and the piston 32. In the present example, the elastic member 33 is sandwiched in an elastically compressed state between a surface on the other side in the axial direction of the small diameter flange portion 15 of the rotating member 6 and a surface on the one side in the axial direction of the piston 32. In other words, by pressing the first friction plate 30 that is located the farthest on the one side in the axial direction toward the other side in the axial direction through the piston 32 by the force of the elastic member 33 attempting to elastically restore, the elastic biasing member 27 elastically biases the first friction plate 30 and the second friction plate 31 in the direction of pressing them against each other.

In the present example, the elastic member 33 is composed of at least one disc spring (two disc springs in the present example). However, in a case of carrying out the present disclosure, the specific configuration of the elastic member is not particularly limited. For example, the elastic member may be configured by at least one coil spring.

The cam device 28 has the drive cam 34, a driven cam 35, and a plurality of rolling elements 36. As the drive cam 34 rotates, the cam device 28 displaces the driven cam 35 in a direction of increasing a distance in the axial direction between the drive cam 34 and the driven cam 35, and thereby presses the elastic biasing member 27 in a direction of releasing the force pressing the first friction plate 30 and the second friction plate 31 against each other.

Figure 4:
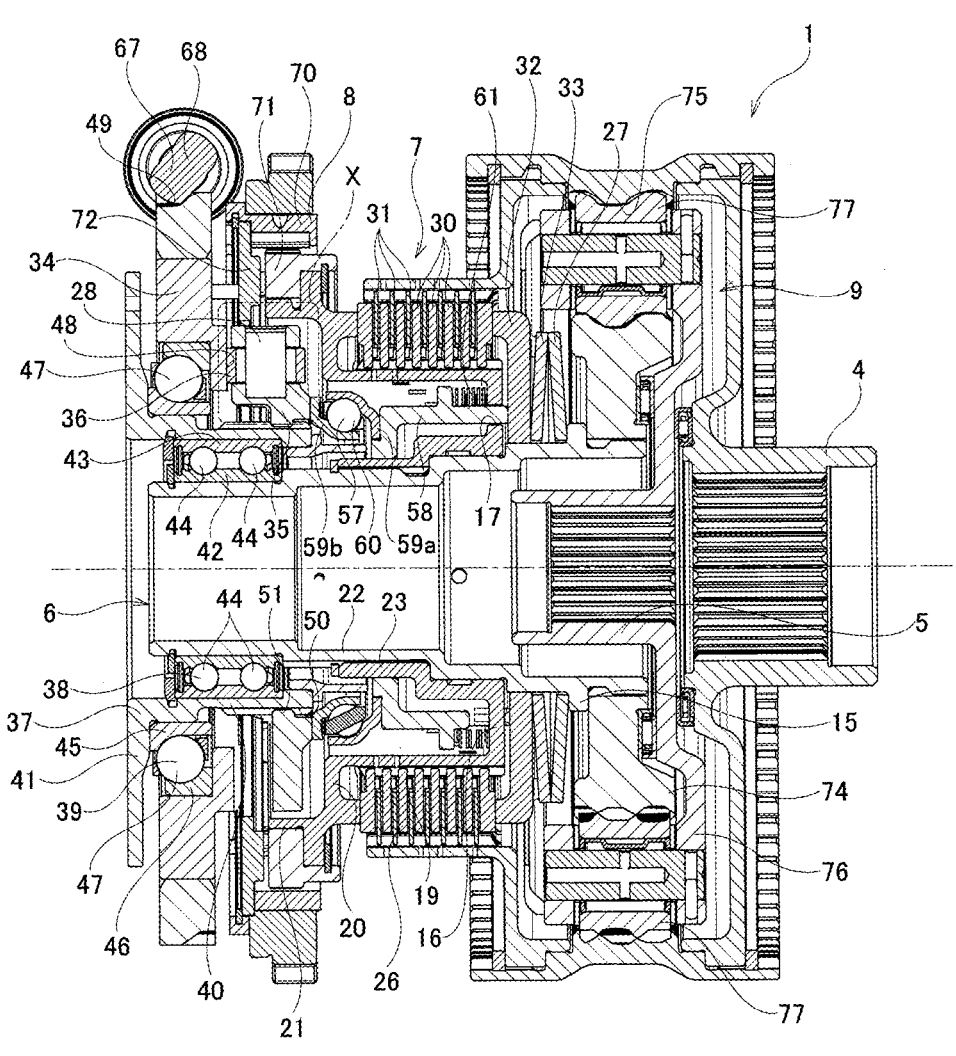
FIG. 4 is a cross-sectional view of the two-speed transmission of the present example.
Figure 5:
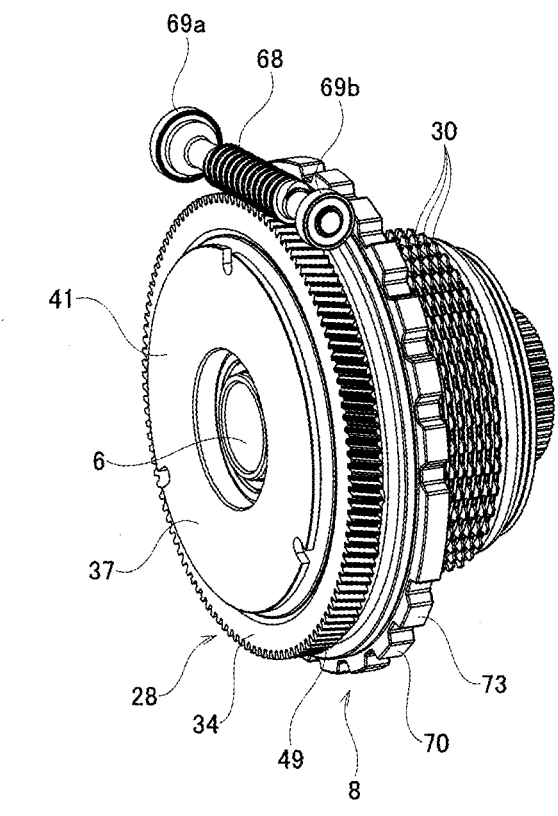
FIG. 5 is a perspective view illustrating the two-speed transmission of the present example with a planetary gears mechanism removed.
Figure 6:
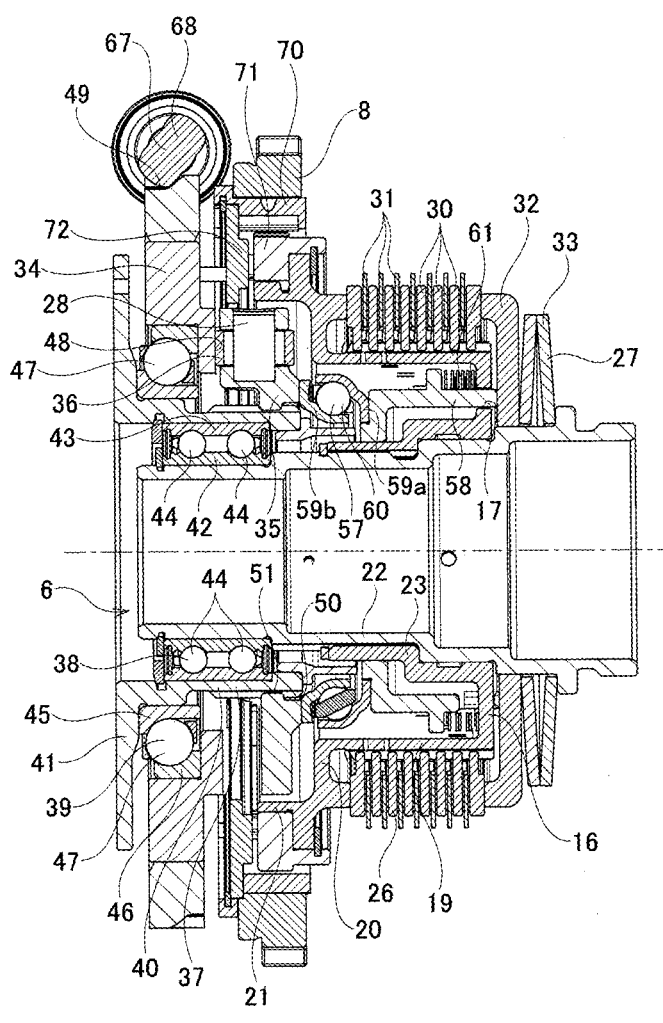
FIG. 6 is a cross-sectional view illustrating the two-speed transmission of the present example with the planetary gears mechanism removed.
Figure 7:
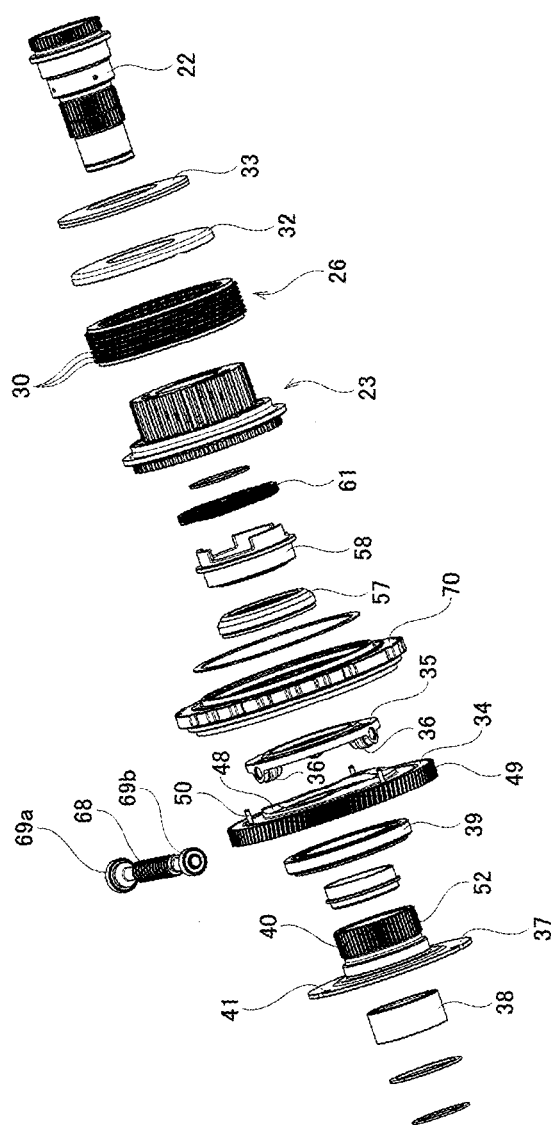
FIG. 7 is an exploded perspective view of the two-speed transmission of the present example.
Figure 8:
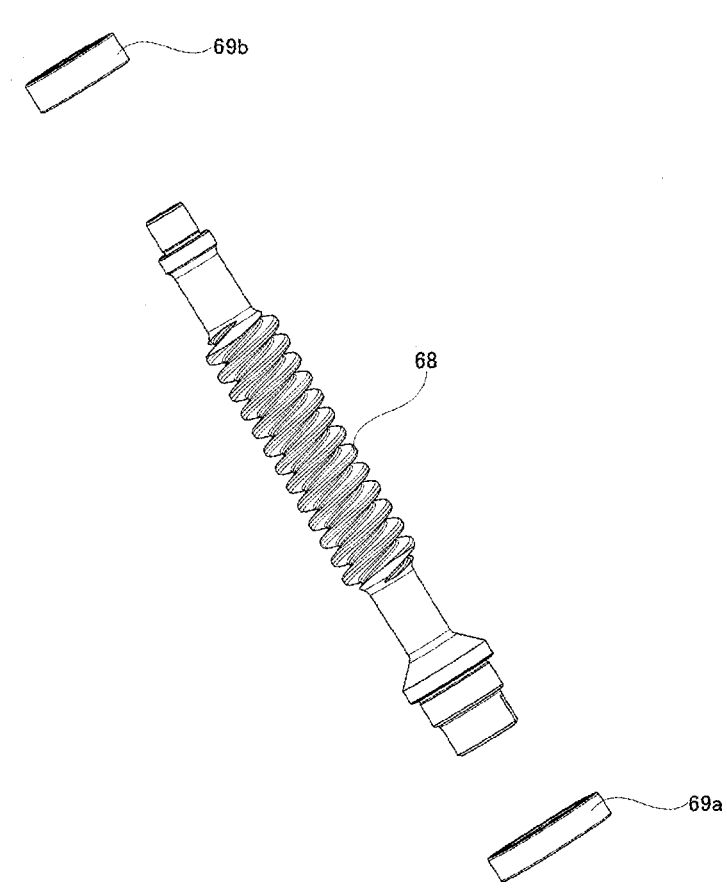
FIG. 8 is an exploded perspective view illustrating a worm and two support bearings removed from the electric friction engagement device of the present example.
Figure 9:
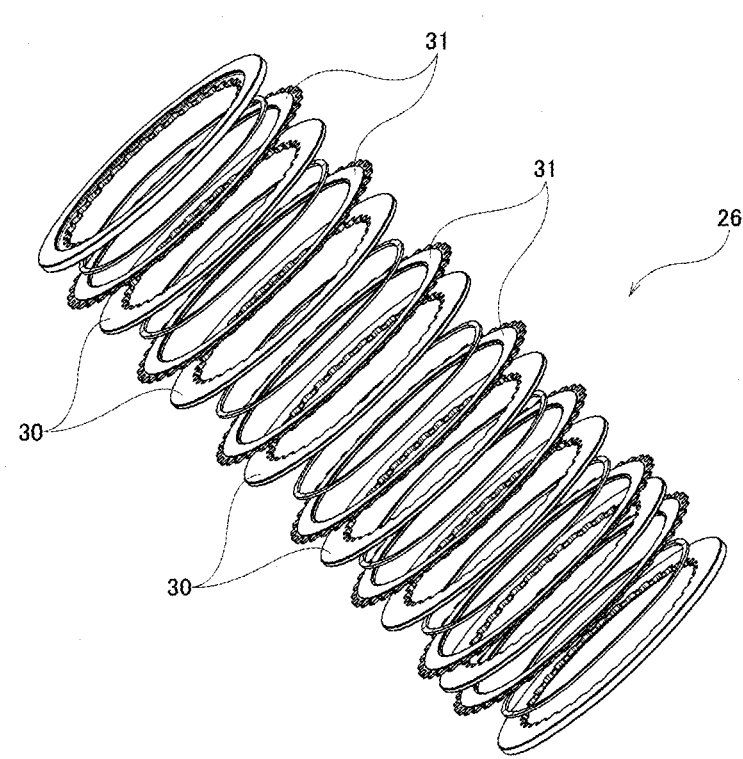
FIG. 9 is an exploded perspective view illustrating a first friction plate and a second friction plate removed from the electric friction engagement device of the present example.
Figure 10:
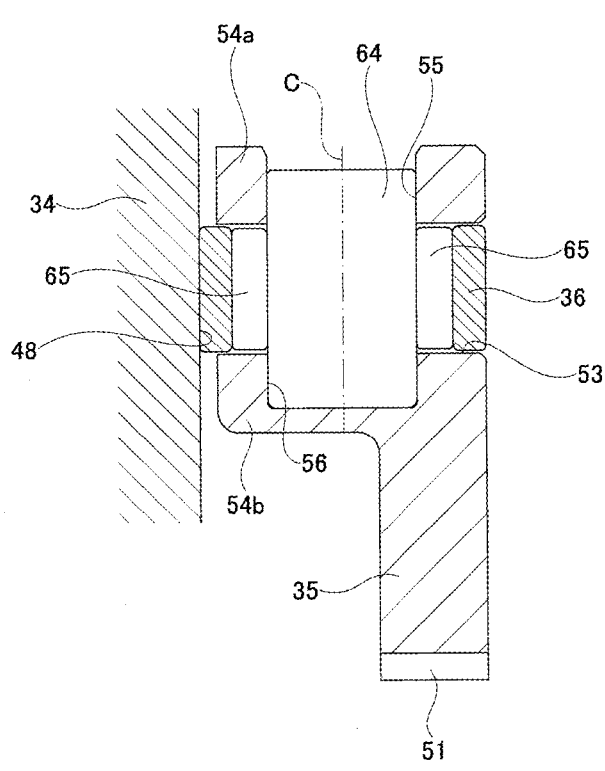
FIG. 10 is an enlarged view of a portion X in FIG. 4.

The drive cam 34 is supported with respect to the rotating member 6 so as to be capable of rotating relative to the rotating member 6 and the input member 4 and so as not to be capable of displacement in the axial direction relative to the rotating member 6. In the present example, as illustrated in FIG. 4 and other figures, the drive cam 34 is supported with respect to the rotating member 6 by a tubular member 37, a radial bearing 38, and an angular ball bearing 39 so as to be capable of rotating relative to the rotating member 6.

The tubular member 37 has a cylindrical portion 40 and an outward-facing flange portion 41 bent outward in the radial direction from an end portion on the other side in the axial direction of the cylindrical portion 40. The outward-facing flange portion 41 of the tubular member 37 is supported by and fixed to the fixed portion 10 by screwing or the like.

The radial bearing 38 has an inner ring 42 externally fitted and fixed to an end portion on the other side in the axial direction of the rotating member 6, an outer ring 43 internally fitted and fixed to the cylindrical portion 40 of the tubular member 37, and a plurality of rolling elements 44 arranged between the inner ring 42 and the outer ring 43 so as to be able to freely roll. In the illustrated example, the radial bearing 38 is configured as a double-row deep groove ball bearing that uses balls as the rolling elements 44. However, the radial bearing is not particularly limited as long as the radial bearing is capable of allowing relative rotation between the first member and the cam device and supporting biasing force in the axial direction from the elastic biasing member, and could be, for example, a deep groove ball bearing, a radial angular ball bearing, or a radial tapered roller bearing.

The angular ball bearing 39 has an inner ring 45 externally fitted and fixed to the cylindrical portion 40 of the tubular member 37, an outer ring 46 internally fitted and fixed to the drive cam 34, and a plurality of balls 47 arranged between the inner ring 45 and the outer ring 46 so as to be able to freely roll.

The driven cam 35 is supported so as to be capable of relative rotation and displacement in the axial direction with respect to the drive cam 34. More specifically, the driven cam 35 is arranged around the rotating member 6 so as to be capable of displacement only in the axial direction. In the present example, the driven cam 35 has a hollow circular plate shape, and is supported by the fixed portion 10 so as to be capable of displacement in the axial direction. In the present example, a female spline portion 51 provided on an inner circumferential surface of the driven cam 35 is engaged using a spline engagement with a male spline portion 52 provided on an outer circumferential surface of a portion on the one side in the axial direction of the cylindrical portion 40 of the tubular member 37, thereby supporting the driven cam 35 by the fixed portion 10 so as to be capable of displacement in the axial direction.

However, the method of supporting the driven cam with respect to the fixed portion is not particularly limited as long as the driven cam can be supported with respect to the fixed portion so as to be capable of displacement only in the axial direction. For example, the driven cam can be supported with respect to the fixed portion so as to be capable of displacement in the axial direction by a key engagement between a protruding portion provided on one of the driven cam and the fixed portion with a recessed groove provided in the other of the driven cam and the fixed portion.

Figure 12:
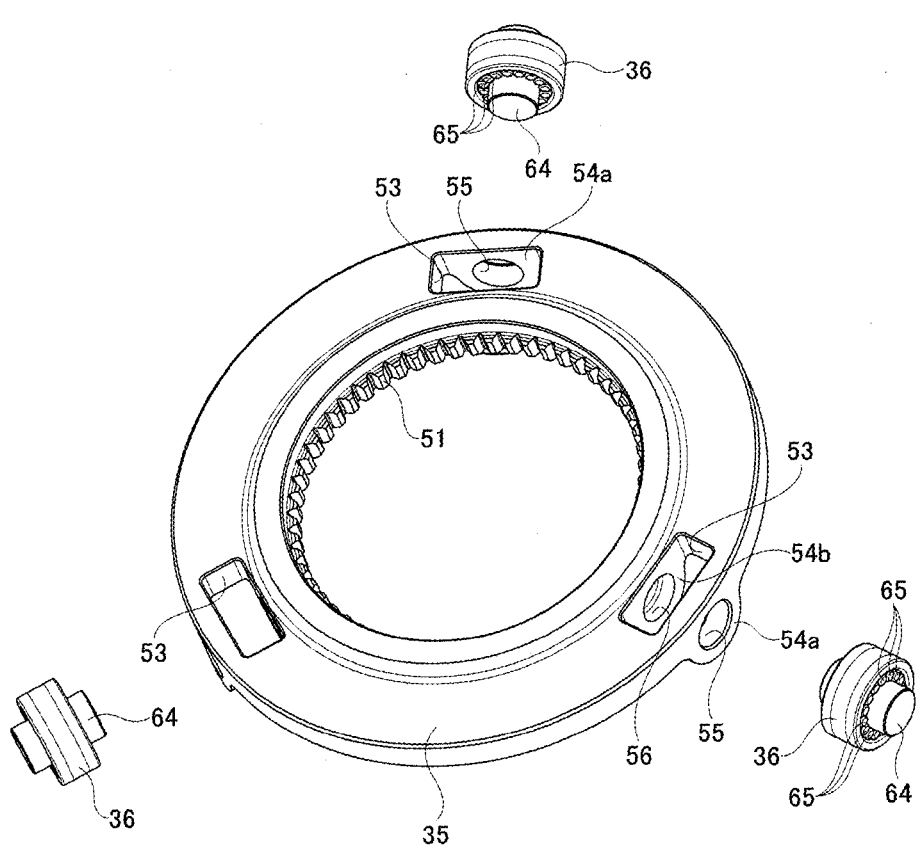
FIG. 12 is an exploded perspective view illustrating a driven cam and rolling elements removed from the electric friction engagement device of the present example.

In the present example, as illustrated in FIG. 12, the driven cam 35 has rectangular holes 53 penetrating in the axial direction at a plurality of locations (three locations in the illustrated example) in the circumferential direction of an intermediate portion in the radial direction, and has support plate portions 54*a*, 54*b* having an approximately semicircular plate shape protruding toward the other side in the axial direction from portions on both sides in the radial direction of each of the rectangular holes 53. Of the support plate portions 54*a*, 54*b*, the support plate portion 54*a* on the outer side in the radial direction has a support hole 55 that is a circular hole that penetrates in the radial direction, and the support plate portion 54*b* on the inner side in the radial direction has a support recessed portion 56 with a circular opening on a surface on the outer side in the radial direction.

The driven cam 35 faces the piston 32 of the elastic biasing member 27 through a thrust bearing 57 and a pressing member 58.

The thrust bearing 57 is provided between the pressing member 58 and the driven cam 35. The thrust bearing 57 has a pair of raceway rings 59*a*, 59*b* and a plurality of rolling elements 60 arranged to roll freely between the pair of raceway rings 59*a*, 59*b*. Of the pair of raceway rings 59*a*, 59*b*, the raceway ring 59*b* on the other side in the axial direction is supported by and fixed to the driven cam 35.

The pressing member 58 has a cylindrical base portion 62 and partial cylindrical portions 63 that protrude toward the one side in the axial direction from a plurality of locations in the circumferential direction (three locations in the illustrated example) of an end portion on the one side in the axial direction of the base portion 62. Of the pair of raceway rings 59*a*, 59*b* of the thrust bearing 57, the raceway ring 59*a* on the one side in the axial direction is supported by and fixed to an end portion on the other side in the axial direction of the base portion 62. The partial cylindrical portions 63 are respectively inserted into the through holes 17 of the rotating member 6, and tip-end portions (end portions on the one side in the axial direction) of the partial cylindrical portions 63 face an intermediate portion in the radial direction of a surface on the other side in the axial direction of the piston 32.

In the present example, a preload applying means 61 for applying a preload to the thrust bearing 57 is provided between the pressing member 58 and the rotating member 6. The preload applying means 61 is sandwiched in an elastically compressed state between the pressing member 58 and a surface on the other side in the axial direction of the first circular ring portion 18 of the flange portion 16 of the rotating member 6. As a result, as illustrated in FIG. 2B, even in a state in which the piston 32 is pressed toward the one side in the axial direction against the elastic restoring force of the elastic member 33, a preload is applied to the thrust bearing 57 and the thrust bearing 57 is prevented from falling out from between the elastic biasing member 27 and the cam device 28.

Note that the elastic force of the preload applying means 61 is smaller than the elastic restoring force of the elastic member 33. The preload applying means 61 can be configured by, for example, at least one disc spring or at least one coil spring. In the present example, the preload applying means 61 is configured by one coil spring.

In the present example, the cam device 28 has a plurality of rolling elements 36 (three in the present example) and a drive cam surface 48 provided on the drive cam 34 as a means for relatively displacing the drive cam 34 and the driven cam 35.

Figure 11:
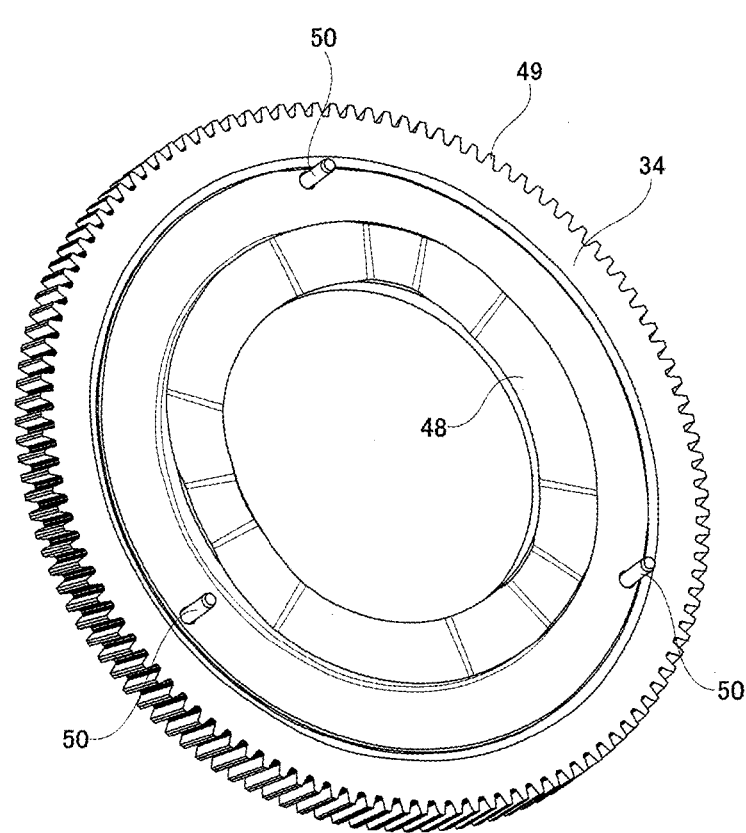
FIG. 11 is a perspective view illustrating a drive cam removed from the electric friction engagement device of the present example.

As illustrated in FIG. 11, the drive cam surface 48 is formed by arranging an equal number of recessed portions and protruding portions alternately in the circumferential direction on an inner side portion in the radial direction of a surface on the one side in the axial direction of the drive cam 34. The drive cam 34 has wheel teeth 49 as a helical gear on an outer circumferential surface thereof. Further, the drive cam 34 has pin portions 50 that protrude toward the one side in the axial direction at a plurality of locations in the circumferential direction (three locations in the illustrated example) of an intermediate portion in the radial direction of a surface on the one side in the axial direction.

Each of the rolling elements 36 is configured by a roller having a cylindrical shape and is supported by a columnar support shaft 64 and a plurality of rollers 65 so as to be able to freely rotate about its own axis relative to the support plate portions 54*a*, 54*b*. That is, an end portion on the outer side in the radial direction of the support shaft 64 centered on the central axis of the driven cam 35 is internally fitted and fixed into the support hole 55 of the support plate portion 54*a* on the outer side in the radial direction, and an end portion on the inner side in the radial direction of the support shaft 64 centered on the central axis of the driven cam 35 is internally fitted and fixed into the support recess 56 of the support plate portion 54*b* on the inner side in the radial direction.

The plurality of rollers 65 are sandwiched between the inner circumferential surface of the rolling element 36 and an outer circumferential surface of an intermediate portion in the axial direction of the support shaft 64 so as to be able to freely roll. Thus, the rolling element 36 is supported by the driven cam 35 so as to be freely rotatable (rotating) about a rotation axis C that faces in the radial direction centered on the central axis of the driven cam 35.

In a state in which the rolling elements 36 are supported by the driven cam 35, a portion on the one side in the axial direction of the rolling element 36 is arranged inside the rectangular holes 53. The outer circumferential surface of each of the rolling elements 36 is in rolling contact with the drive cam surface 48 provided on a surface on the other side in the axial direction of the drive cam 34.

In the cam device 28, as the drive cam 34 rotates, the amount that the rolling elements 36 ride up from the bottom portions of the recessed portions of the drive cam surface 48 increases or decreases, thereby moving the driven cam 35 in the axial direction.

That is, when the drive cam 34 is rotated in a predetermined direction, the amount that the rolling elements 36 ride up from the bottom portions of the recessed portions of the drive cam surface 48 increases, and the driven cam 35 moves to the one side in the axial direction. When the driven cam 35 moves to the one side in the axial direction, the piston 32 of the elastic biasing member 27 is pressed toward the one side in the axial direction through the thrust bearing 57 and the pressing member 58, and the elastic member 33 is elastically compressed.

Due to this, the force pressing the first friction plate 30 and the second friction plate 31 against each other is decreased, and ultimately causes the force to be lost. The action of the return spring 78 widens the distance between the first friction plate 30 and the second friction plate 31, making the friction engagement portion 26 switched to the state in which torque is not transmitted between the rotating member 6 and the input member 4.

On the other hand, when the drive cam 34 is rotated in a direction opposite to the predetermined direction, the amount that the rolling elements 36 ride up from the bottom portions of the recessed portions of the drive cam surface 48 decreases, and the driven cam 35 moves to the other side in the axial direction. When the driven cam 35 moves to the other side in the axial direction, the force in which the piston 32 of the elastic biasing member 27 is pressed toward the one side in the axial direction through the thrust bearing 57 and the pressing member 58 decreases.

When the force pressing the piston 32 toward the one side in the axial direction decreases, the piston 32, thrust bearing 57, and pressing member 58 are pressed toward the other side in the axial direction mainly by the elastic restoring force of the first friction plate 30 and the elastic member 33, and the piston 32 presses the second friction plate 31 closest to the one side in the axial direction toward the other side in the axial direction. As a result, the first friction plate 30 and the second friction plate 31 press against each other, and the friction engagement portion 26 is switched to the state in which torque is transmitted between the rotating member 6 and the input member 4.

In the present example, rollers are used as the rolling elements 36, and the rolling elements 36 are supported so as to be able to freely rotate (spin) around the rotation axis C facing in the radial direction centered on the central axis of the driven cam 35. Therefore, due to the rotation of the drive cam 34, the driven cam 35 can be reliably displaced in the axial direction.

In a case in which balls are used as the rolling elements of the cam device, when the drive cam is rotated, there is a possibility that slippage may occur at the area of rolling contact between the surface of the rolling element and the drive cam surface and/or the driven cam surface. In a case in which slippage occurs at the area of rolling contact between the surface of the rolling element and the drive cam surface and/or driven cam surface, the driven cam may not be able to displace in the axial direction, or the amount of displacement in the axial direction of the driven cam relative to the amount of rotation of the drive cam may not be sufficiently secured.

In the present example, since rollers are used as the rolling elements 36, slippage is prevented from occurring at the area of rolling contact between the outer circumferential surface of the rolling elements 36 and the drive cam surface 48 when the drive cam 34 is rotated, and due to the rotation of the drive cam 34, the driven cam 35 can be reliably displaced in the axial direction. However, when carrying out the present disclosure, balls may also be used as the rolling elements of the cam device.

In addition, when carrying out the present disclosure, the cam device may be a cam device in which the drive cam surface of the drive cam and the driven cam surface of the driven cam are directly engaged (sliding) with each other, or a cam device which has a driven cam having a guide groove that extends in the circumferential direction on an outer circumferential surface thereof and changes in the axial direction, and a drive cam having an engaging protruding portion that engages with the guide groove to enable displacement along the guide groove.

The electric actuator 29 has a shift motor 66 and a reducer 67, and the drive cam 34 of the cam device 28 is rotated and driven by the shift motor 66 through the reducer 67.

In the present example, the reducer 67 is configured by a worm reducer. That is, the reducer 67 is configured by worm teeth provided on an outer circumferential surface of a worm 68 connected to an output shaft of the shift motor 66 engaging with wheel teeth 49 provided on the outer circumferential surface of the drive cam 34. The worm 68 is rotatably supported by the fixed portion 10 by a pair of support bearings 69*a*, 69*b*.

However, the reducer 67 may also be configured by engaging a spur gear or a bevel gear provided on an output shaft of an electric motor with a spur gear or bevel gear provided on the drive cam, or by passing a belt or chain between an output shaft of an electric motor and the drive cam.

In the present example, a return spring 78 (illustrated only in FIG. 1) is further provided between the first friction plate 30 and the second friction plate 31, and elastically biases the first friction plate 30 and the second friction plate 31 in directions to increase the gap between them. The elastic force of the return spring 78 is smaller than the elastic restoring force of the elastic member 33 of the elastic biasing member 27.

In particular, the electric friction engagement device 7 of the present example has a function of detecting the piston touch point Op at which the fastening force of the friction engagement portion 26 begins to decrease, and a function of detecting the clutch touch point $\theta_f$ at which the fastening force becomes zero, when switching from the state (connected mode) in which torque is transmitted between the rotating member 6, which is the first member, and the input member 4, which is the second member, to the state (disconnected mode) in which torque is not transmitted between the rotating member 6 and the input member 4. Further, the electric friction engagement device 7 of the present example has a function for detecting abnormalities that may lead to failure.

The electric friction engagement device 7 of the present example will be further explained with additional components described, followed by a more detailed explanation of the functions described above.

The brake device 8 is provided between the fixed portion 10 and the rotating member 6, and switches between a rotatable state and a non-rotatable state of the rotating member 6 relative to the fixed portion 10. In the present example, the brake device 8 is provide between the inner circumferential surface of the fixed portion 10 and the second cylindrical portion 21 of the rotating member 6.

The brake device 8 can be configured by a meshing or friction type brake device that can be switched between engaged and disengaged states by an actuator. The actuator for switching the brake device between engaged and disengaged states is not particularly limited, and a hydraulic actuator, an electromagnetic actuator, or the like may be adopted.

In the present example, the brake device 8 includes an outer diameter side cylindrical member 70, an inner diameter side cylindrical member 71, at least one engagement pin (not illustrated), and a selection plate 72.

The outer diameter side cylindrical member 70 has an outer peripheral side uneven portion 73 in which recessed portions and protruding portions are alternately arranged in the circumferential direction on an outer circumferential surface thereof. The outer diameter side cylindrical member 70 is supported so as not to rotate relative to the fixed portion 10 by engaging the outer peripheral side uneven portion 73 with an inner peripheral side uneven portion provided on the inner circumferential surface of the fixed portion 10.

The inner diameter side cylindrical member 71 is externally fitted and fixed to the second cylindrical portion 21 of the rotating member 6 so as not to relatively rotate.

The engagement pin is provided between the outer diameter side cylindrical member 70 and the inner diameter side cylindrical member 71 so as to be able to be engaged and disengaged. In the present example, the engagement pin protrudes from the inner circumferential surface of the outer diameter side cylindrical member 70 toward the inner side in the radial direction and is supported by the outer diameter side cylindrical member 70 with an elastic force directed to the inner side in the radial direction being applied. The inner diameter side cylindrical member 71 has an engaging recessed portion on an outer circumferential surface thereof, into which a tip-end portion of the engagement pin can engage.

The selection plate 72 has a mode selection portion which is an uneven portion in the circumferential direction, and has engagement holes (not illustrated) at a plurality of locations in the circumferential direction of a surface on the other side in the axial direction (three locations in the present example). A pin portion 50 provided on the drive cam 34 is fitted into each of the engagement holes without any looseness. As a result, the drive cam 34 and the selection plate 72 rotate integrally (in the same direction at the same speed).

The brake device 8 is switched between a state in which the outer diameter side cylindrical member 70 and the inner diameter side cylindrical member 71 can relatively rotate and a state in which they cannot relatively rotate based on the rotation of the selection plate 72. That is, by rotating the selection plate 72, the protruding portion of the mode selection portion pushes the engagement pin toward the outside in the radial direction, so that the engagement pin is disengaged from the engaging recessed portion. This allows rotation of the inner diameter side cylindrical member 71 relative to the outer diameter side cylindrical member 70, and allows rotation of the rotating member 6 relative to the fixed portion 10.

On the other hand, by rotating the selection plate 72, the engagement pin and the engaging recessed portion are engaged by moving the protruding portion of the mode selection portion to a location deviated in the circumferential direction from the tip-end portion of the engagement pin. This prevents the inner diameter side cylindrical member 71 from rotating relative to the outer diameter side cylindrical member 70, and prevents the rotating member 6 from rotating relative to the fixed portion 10.

In a case of carrying out the present disclosure, the brake device is not limited to a brake device capable of switching between engaged and disengaged states by an actuator, and conventionally known clutches of various structures may be adopted. More specifically, the brake device can also be configured by a one-way clutch including a freewheel.

In the present example, the planetary reduction mechanism 9 has a sun gear 74, a ring gear 75, a carrier 76, and a plurality of planetary gears 77. In other words, the planetary reduction mechanism is configured by a single-pinion type planetary gear mechanism.

The sun gear 74 is connected to the rotating member 6 so as to be capable of transmitting torque. In the present example, the sun gear 74 is provided at an end portion on the one side in the axial direction of the rotating member 6.

The ring gear 75 is arranged around the sun gear 74 and coaxially with the sun gear 74, and is connected to the input member 4 so as to be capable of transmitting torque. In the present example, the ring gear 75 is provided at an intermediate portion in the axial direction of the input member 4.

The carrier 76 is arranged between the sun gear 74 and the ring gear 75 in the radial direction and coaxially with the sun gear 74 and the ring gear 75, and is connected to the output member 5 so as to be capable of transmitting torque.

Each of the plurality of planetary gears 77 engage with the sun gear 74 and the ring gear 75, and is supported by the carrier 76 so as to be capable of rotation (spinning) about its own central axis.

In a case of carrying out the present disclosure, a double-pinion type planetary gear mechanism may also be adopted as a planetary reduction mechanism. Alternatively, the planetary reduction mechanism may also be configured by a friction roller mechanism having a sun roller, a ring roller arranged around the sun roller, and planetary rollers arranged between the sun roller and the ring roller in the radial direction and each having a rolling surface which is an outer circumferential surface thereof frictionally engaged with the outer circumferential surface of the sun roller and the inner circumferential surface of the ring roller.

The two-speed transmission 1 of the present example is capable of switching between a low reduction ratio mode in which the reduction ratio between the input member 4 and the output member 5 is small (the reduction ratio is one), and a high reduction ratio mode in which the reduction ratio is larger than the low reduction ratio mode, by switching the mode of the electric friction engagement device 7 and the engaged and disengaged states of the brake device 8.

Low Reduction Ratio Mode

To switch the two-speed transmission 1 to the low reduction ratio mode, the electric friction engagement device 7 is switched to the connected mode, and the brake device 8 is disconnected.

More specifically, as illustrated in FIG. 2A, the drive cam 34 is rotated and driven by the shift motor 66 in the direction opposite to the predetermined direction, that is, in a direction in which the amount that the rolling elements 36 ride up from the bottom portions of the recessed portions of the drive cam surface 48 decreases. As a result, the driven cam 35 releases the force pressing the piston 32 toward the one side in the axial direction through the thrust bearing 57 and the pressing member 58.

When the force pressing the piston 32 toward the one side in the axial direction is released, the piston 32, thrust bearing 57, and pressing member 58 are pressed toward the other side in the axial direction mainly by the elastic restoring force of the first friction plate 30 and the elastic member 33, and the piston 32 presses the second friction plate 31 which is the closest to the one side in the axial direction toward the other side in the axial direction. As a result, the first friction plate 30 and the second friction plate 31 press against each other, and the input member 4 and the rotating member 6 rotate integrally. In other words, the electric friction engagement device 7 switches to the connected mode. Therefore, as a result, the sun gear 74 and the ring gear 75 rotate integrally.

When the drive cam 34 is rotated and driven in the direction opposite to the predetermined direction, the selection plate 72 is also rotated and driven in the direction opposite to the predetermined direction. As the selection plate 72 rotates, the engagement pin supported by the outer diameter side cylindrical member 70 is pushed toward outside in the radial direction by the protruding portion of the mode selection portion provided on the selection plate 72, and the engagement pin is disengaged from the engaging recessed portion provided on the inner diameter side cylindrical member 71.

As a result, the brake device 8 is disconnected. In other words, the inner diameter side cylindrical member 71 is allowed to rotate relative to the outer diameter side cylindrical member 70, and the rotating member 6 is allowed to rotate relative to the fixed portion 10. As a result, the sun gear 74 is allowed to rotate relative to the fixed portion 10.

In the low reduction ratio mode, the sun gear 74, the ring gear 75, and the carrier 76 rotate in the same direction and at the same speed, and the entire planetary reduction mechanism 9 rotates as a unit, in a glued state. Therefore, the rotational torque of the input member 4 is transmitted as it is to the output member 5 through the path as indicated by the thick line in FIG. 2A without being increased (reduced). In other words, in the low reduction ratio mode, the reduction ratio between the input member 4 and the output member 5 is one.

High Reduction Ratio Mode

To switch the two-speed transmission 1 to the high reduction ratio mode, the electric friction engagement device 7 is switched to the disconnected mode, and the brake device 8 is connected.

More specifically, as illustrated in FIG. 2B, the drive cam 34 is rotated and driven by the shift motor 66 in the predetermined direction, that is, in a direction in which the amount that the rolling elements 36 ride up from the bottom portions of the recessed portions of the drive cam surface 48 increases. As a result, the driven cam 35 presses the piston 32 toward the one side in the axial direction through the thrust bearing 57 and the pressing member 58, elastically contracts the axial dimension of the elastic member 33, and releases the force pressing the first friction plate 30 and the second friction plate 31 against each other.

As a result, due to the action of the return spring 78, the distance between the first friction plate 30 and the second friction plate 31 widens, allowing the input member 4 and the rotating member 6 to rotate relative to each other. That is, the electric friction engagement device 7 switches to the disconnected mode. As a result, the sun gear 74 and the ring gear 75 become capable of rotating relative to each other.

When the drive cam 34 is rotated and driven in the predetermined direction, the selection plate 72 is also rotated and driven in the direction opposite to the predetermined direction. As the selection plate 72 rotates, the protruding portion of the mode selection portion provided on the selection plate 72 moves to a location deviated in the circumferential direction from the tip-end portion of the engagement pin supported by the outer diameter side cylindrical member 70. As a result, the engagement pin engages with the engaging recessed portion provided in the inner diameter side cylindrical member 71, and the brake device 8 is connected. That is, relative rotation of the rotating member 6 with respect to the fixed portion 10 is prevented, and rotation of the sun gear 74 with respect to the fixed portion 10 is prevented.

In the high reduction ratio mode, the rotational torque of the input member 4 is transmitted as illustrated by the thick line in FIG. 2B in the order of the input member 4, the ring gear 75, the rotational motion of the planetary gears 77, the orbital motion of the planetary gears 77 based on engagement with the sun gear 74, the carrier 76, and the output member 5.

In this way, in the high reduction ratio mode, the rotational torque of the input member 4 is increased by the planetary reduction mechanism 9 and transmitted to the output member 5. In the high reduction ratio mode, the reduction ratio between the input member 4 and the output member 5 is determined by the gear ratio between the ring gear 75 and the sun gear 74 (number of teeth of the ring gear 75/number of teeth of the sun gear 74).

The two-speed transmission 1 of the present example can switch the reduction ratio between the input member 4 and the output member 5 between two stages of high and low, by switching the mode of the friction engagement device 7 and the connected/disconnected state of the brake device 8. More specifically, when the rotational torque input to the input member 4 is in a low-speed and high-torque region, the two-speed transmission 1 is switched to the high reduction ratio mode, and when the rotational torque input to the input member 4 is in a high-speed and low-torque region, the two-speed transmission 1 is switched to a low reduction ratio mode. As a result, the acceleration and high-speed performance of an electric automobile or hybrid automobile running using only an electric motor as a drive source can be made to be similar to those of a gasoline engine automobile.

When switching the mode of the two-speed transmission 1, it is not necessary to switch the mode of the electric friction engagement device 7 and switch the connected/disconnected state of the brake device 8 completely simultaneously, and they may be switched slightly later or earlier. In other words, the fastening forces and timings of the electric friction engagement device 7 and the brake device 8 can be appropriately adjusted so as to reduce the shift shock associated with the mode switching of the two-speed transmission 1.

The electric friction engagement device 7 of the present example has a function of detecting the piston touch point $\theta_p$ at which the fastening force of the friction engagement portion 26 begins to decrease and a function of detecting the clutch touch point $\theta_f$ at which the fastening force becomes zero, when switching from the connected mode to the disconnected mode. These functions will be described below with reference to FIG. 14A to FIG. 18.

Figure 14A:
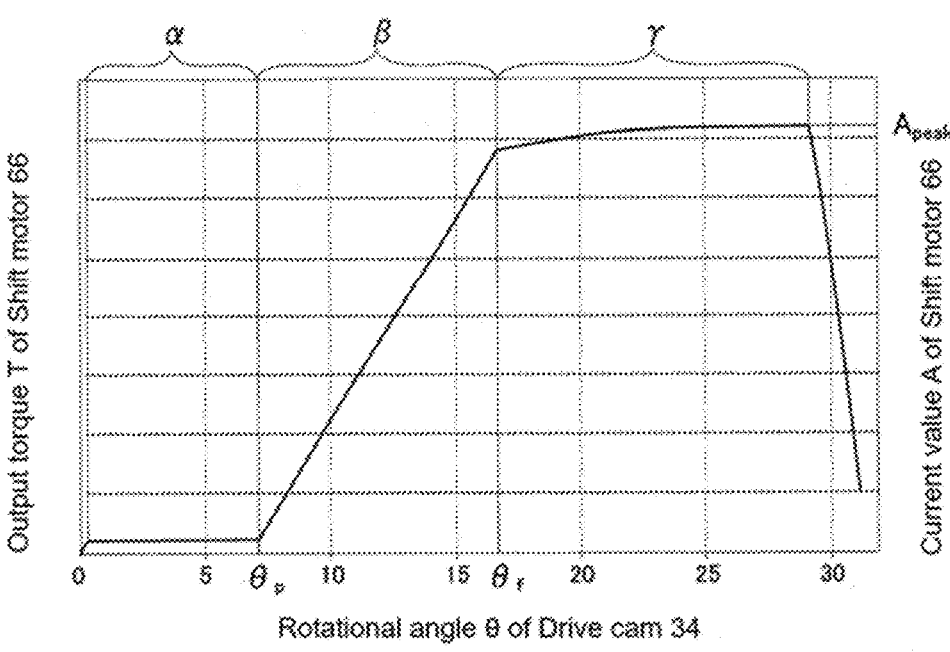
FIGS. 14A and 14B are graphs illustrating a relationship between a rotational angle of the drive cam and an output torque and current value of a shift motor when the electric friction engagement device of the present example is switched from a connected mode to a disconnected mode, with FIG. 14A illustrating a case in which the first friction plate and the second friction plate are new and not worn, and FIG. 14B illustrating a case in which the first friction plate and the second friction plate have been significantly worn.
Figure 14B:
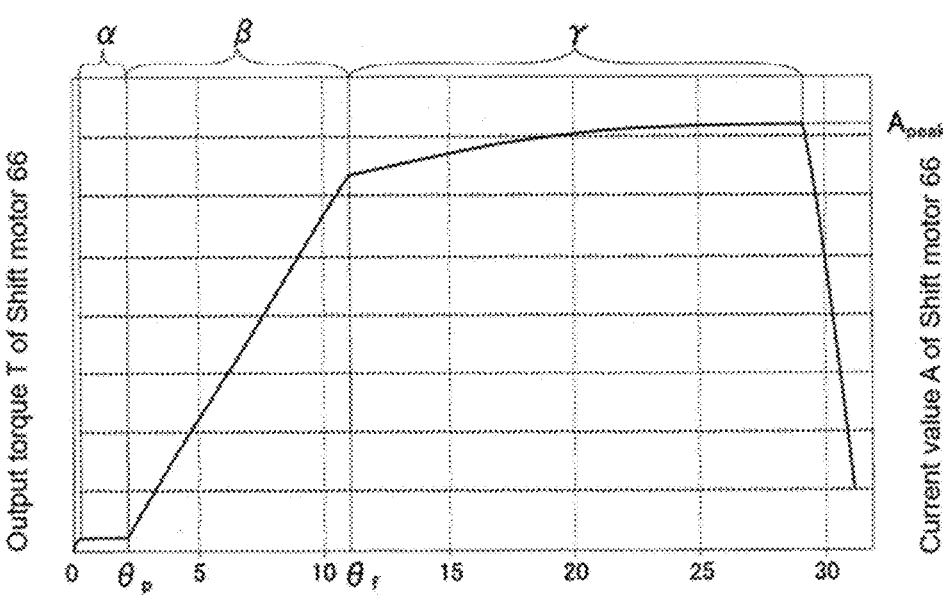

FIG. 14A and FIG. 14B are graphs showing the relationship between the rotational angle θ of the drive cam 34 and the output torque T and current value A of the shift motor 66 when the electric friction engagement device 7 is switched from the connected mode to the disconnected mode. FIG. 14A shows the first friction plate 30 and the second friction plate 31 when they are new and not worn, and FIG. 14B shows the first friction plate 30 and the second friction plate 31 when they have been significantly worn.

As is apparent from FIGS. 14A and 14B, when switching the mode of the electric friction engagement device 7, the output torque T of the shift motor 66 and the current value A of the shift motor 66 change with the same tendency. The electric friction engagement device 7 of the present example detects the piston touch point $\theta_p$ and the clutch touch point $\theta_f$ based on the current value A of the shift motor 66 when the electric friction engagement device 7 is switched from the connected mode to the disconnected mode.

Figure 15:
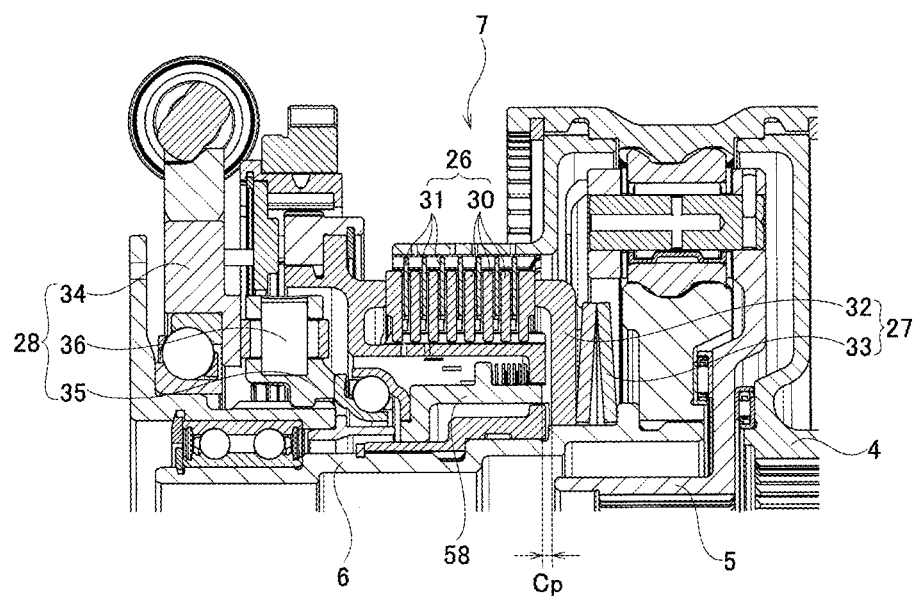
FIG. 15 is a cross-sectional view illustrating a state in which the electric friction engagement device of the present example is switched to the connected mode.

When the electric friction engagement device 7 is switched to the connected mode, the rolling element 36 of the cam device 28 is located at the bottom portions of the recessed portion of the drive cam surface 48. In this state, as illustrated in FIG. 15, a piston clearance $C_p$ exists between the end portion on the one side in the axial direction of the pressing member 58 and the surface on the other side in the axial direction of the piston 32. The piston 32 is permitted to displace to the other side in the axial direction based on the presence of this piston clearance $C_p$.

Therefore, the force of the elastic member 33 attempting to elastically restore the shape of the elastic member 33 causes the piston 32 to be elastically pressed toward the other side in the axial direction, and the piston 32 presses the first friction plate 30 that is closest to the one side in the axial direction toward the other side in the axial direction, causing the first friction plate 30 and the second friction plate 31 to be pressed against each other.

To switch the electric friction engagement device 7 from the connected mode to the disconnected mode, the drive cam 34 is rotated in the predetermined direction based on the energization of the shift motor 66, and the amount by which the rolling element 36 rides up from the bottom portion of the recessed portion is increased. At this time, the current value A of shift motor 66 is approximately constant (range α in FIGS. 14A and 14B), except for the starting current that flows temporarily.

Figure 16:
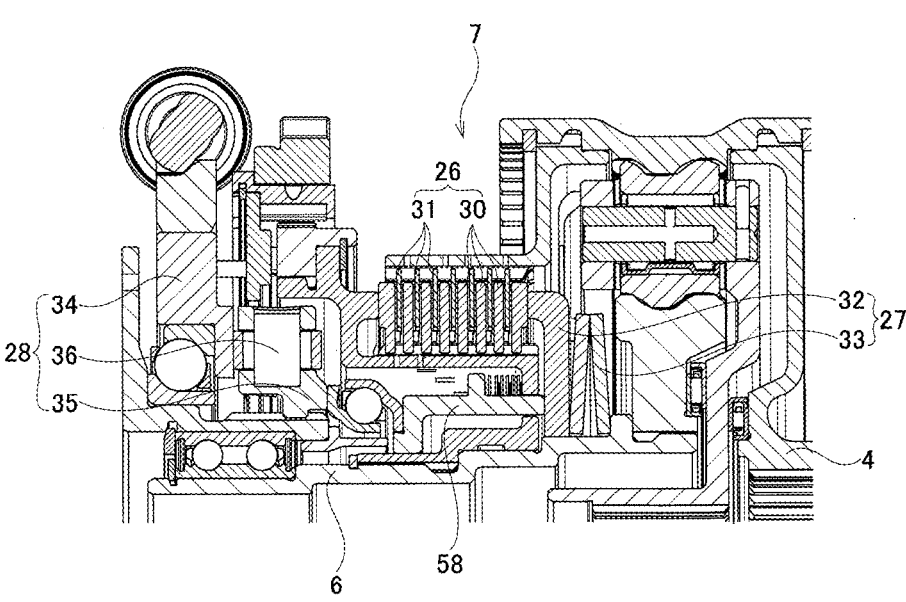
FIG. 16 is a cross-sectional view illustrating a state in which the pressing member and a piston are in contact with each other during switching of the electric friction engagement device of the present example from the connected mode to the disconnected mode.

By increasing the amount that the rolling element 36 rides up from the bottom portion of the recessed portion, the pressing member 58 is moved toward the one side in the axial direction, and as illustrated in FIG. 16, the end portion on the one side in the axial direction of the pressing member 58 comes into contact with the surface on the other side in the axial direction of the piston 32. In other words, the piston clearance $C_p$ becomes zero.

When the drive cam 34 is further rotated and driven in the predetermined direction by the shift motor 66 from the state illustrated in FIG. 16, the piston 32 is pressed toward the one side in the axial direction by the driven cam 35 through the pressing member 58 against the elastic restoring force of the elastic member 33. In this state, a part of the elastic restoring force of the elastic member 33 is supported by the cam device 28 through the pressing member 58 and the thrust bearing 17, and the rest is supported by the fixed portion 10 through the friction engagement portion 26 and the brake device 8.

As the piston 32 is pressed toward the one side in the axial direction, the force pressing the first friction plate 30 and the second friction plate 31 against each other gradually decreases, mainly based on the elastic restoring force of the second friction plate 31 and the elastic member 33. That is, the fastening force of the friction engagement portion 26 gradually decreases.

While the fastening force of the friction engagement portion 26 is gradually reduced, the current value A of the shift motor 66 increases at a substantially constant rate of increase (constant gradient) (range β in FIGS. 14A and 14B). That is, the rate of increase of the current value A in the range β is greater than the rate of increase of the current value A in the range α.

In the electric friction engagement device 7 of the present example, the phase (rotational angle from a reference position (for example, an initial position where the rolling element 36 is located at the bottom portion of the recessed portion)) θ in the rotational direction of the drive cam 34 when the current value A of the shift motor 66 begins to increase at an increase rate equal to or greater than a predetermined first threshold value after starting of current supply to the shift motor 66 in order to switch the electric friction engagement device 7 from the connected mode to the disconnected mode, is detected as the piston touch point $\theta_p$ at which the piston clearance $C_p$ becomes zero. The first threshold value can be obtained in advance by experiment, simulation, or the like.

The rate of increase in the current value A is the amount of increase ΔA in the current value A per unit rotation angle Δθ of the drive cam 34. Note that when the drive cam 34 is rotated in the predetermined direction at a constant rotational speed, the increase ΔA in the current value A per unit time can also be used for the judgment.

Figure 17:
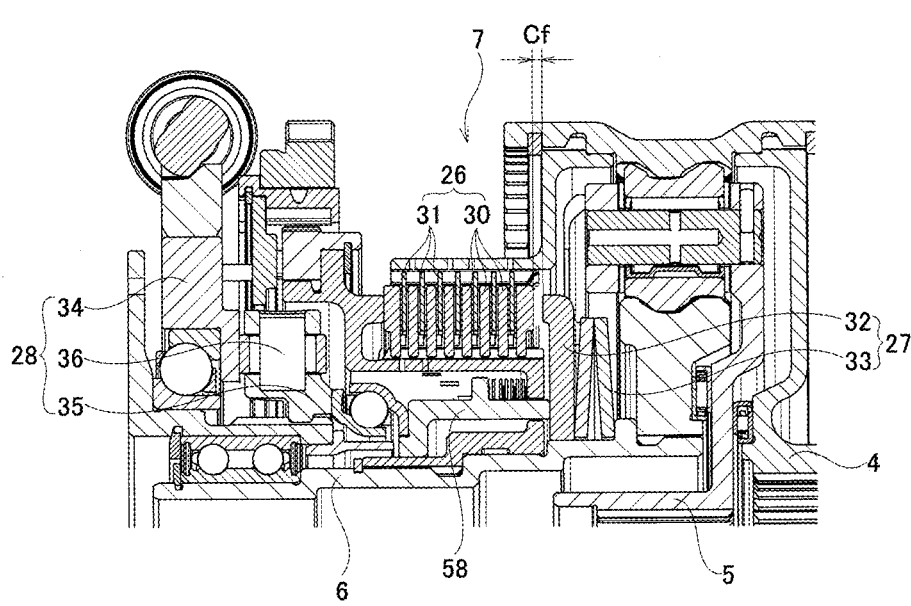
FIG. 17 is a cross-sectional view illustrating a state in which the electric friction engagement device of the present example is switched to the disconnected mode.

The fastening force of the friction engagement portion 26 gradually decreases, and at the moment when the fastening force becomes zero, as illustrated in FIG. 17, the clutch clearance $C_f$ begins to be generated between the end portion on the other side in the axial direction of the piston 32 and the first friction plate 30 that is located the farthest on the one side in the axial direction. When the clutch clearance $C_f$ begins to be generated, almost the entire elastic restoring force of the elastic member 33 is supported by the cam device 28 through the pressing member 58 and the thrust bearing 57.

After the clutch clearance $C_f$ begins to be generated in this manner, the current value A of the shift motor 66 increases gently and logarithmically (range γ in FIGS. 14A and 14B). That is, the rate of increase of the current value A in the range γ is smaller than the rate of increase of the current value A in the range β.

In the electric friction engagement device 7 of the present example, the phase θ in the rotational direction of the drive cam 34 when the rate of increase of the current value A of the shift motor 66 becomes equal to or lower than a predetermined second threshold value after the phase in the rotational direction of the drive cam 34 exceeds the piston touch point $\theta_p$ when the electric friction engagement device 7 is switched from the connected mode to the disconnected mode, is detected as the clutch touch point $\theta_f$ at which the clutch clearance $C_f$ becomes zero. The second threshold value is smaller than the first threshold value. The second threshold value can be obtained in advance by experiment, simulation, or the like.

The electric friction engagement device 7 of the present example further includes a function for detecting an abnormality that may lead to a breakdown.

The electric friction engagement device 7 of the present example has, as a first function for detecting an abnormality, a function of determining whether the wear of the first friction plate 30 and the second friction plate 31 has progressed to the limit of use.

As the electric friction engagement device 7 is used, the amount of wear on the first friction plate 30 and the second friction plate 31 increases, and the amount of pressure that is required to be applied by the elastic biasing member 27 to press the first friction plate 30, which is closest to the one side in the axial direction, toward the other side in the axial direction in order to switch the electric friction engagement device 7 to the connected mode increases. In other words, the amount of pressure required for the cam device 28 to press the piston 32 to the one side in the axial direction when switching the electric friction engagement device 7 to the disconnected mode is reduced.

As a result, the relationship between the rotation angle θ of the drive cam 34 and the current value A of the shift motor 66 changes from the state illustrated in FIG. 14A to the state illustrated in FIG. 14B. As is clear from FIGS. 14A and 14B, as the amount of wear of the first friction plate 30 and the second friction plate 31 increases, the piston touch point $\theta_p$ and the clutch touch point $\theta_f$ become smaller.

By determining whether the piston touch point $\theta_p$ or the clutch touch point $\theta_f$ falls within a predetermined angle range, it is possible to determine whether the wear of the first friction plate 30 and the second friction plate 31 has progressed to the limit of use. In other words, the electric friction engagement device 7 has a function of determining whether the piston touch point $\theta_p$ or the clutch touch point $\theta_f$ is equal to or greater than a predetermined lower limit value $\theta_{min}$ and equal to or less than a predetermined upper limit value $\theta_{max}$.

The lower limit value $\theta_{min}$ and the upper limit value $\theta_{max}$ can each be obtained in advance by experiment, simulation, or the like, and are appropriately set depending on which of the piston touch point $\theta_p$ and the clutch touch point $\theta_f$ is used as the judgment criterion.

In the electric friction engagement device 7 of the present example, whether the wear of the first friction plate 30 and the second friction plate 31 has progressed to the limit of use is determined by determining whether the clutch touch point $\theta_f$ is within a predetermined angle range.

The electric friction engagement device 7 of the present example further has, as a second function for detecting an abnormality, a function of determining whether the maximum value $A_{peak}$ of the current value A of the shift motor 66 is within a predetermined range. In other words, the electric friction engagement device 7 has a function of determining whether the maximum value $A_{peak}$ of the shift motor 66 is equal to or greater than a predetermined lower limit value $A_{min}$ and equal to or less than a predetermined upper limit value $A_{max}$.

The lower limit value $A_{min}$ and the upper limit value $A_{max}$ can each be determined in advance by experiment, simulation, or the like. In the electric friction engagement device 7 of the present example, the current value A of the shift motor 66 reaches the maximum value $A_{peak}$ when the rolling elements 36 ride up onto the tip-end portion of the protruding portions of the drive cam surface 48.

Figure 18:
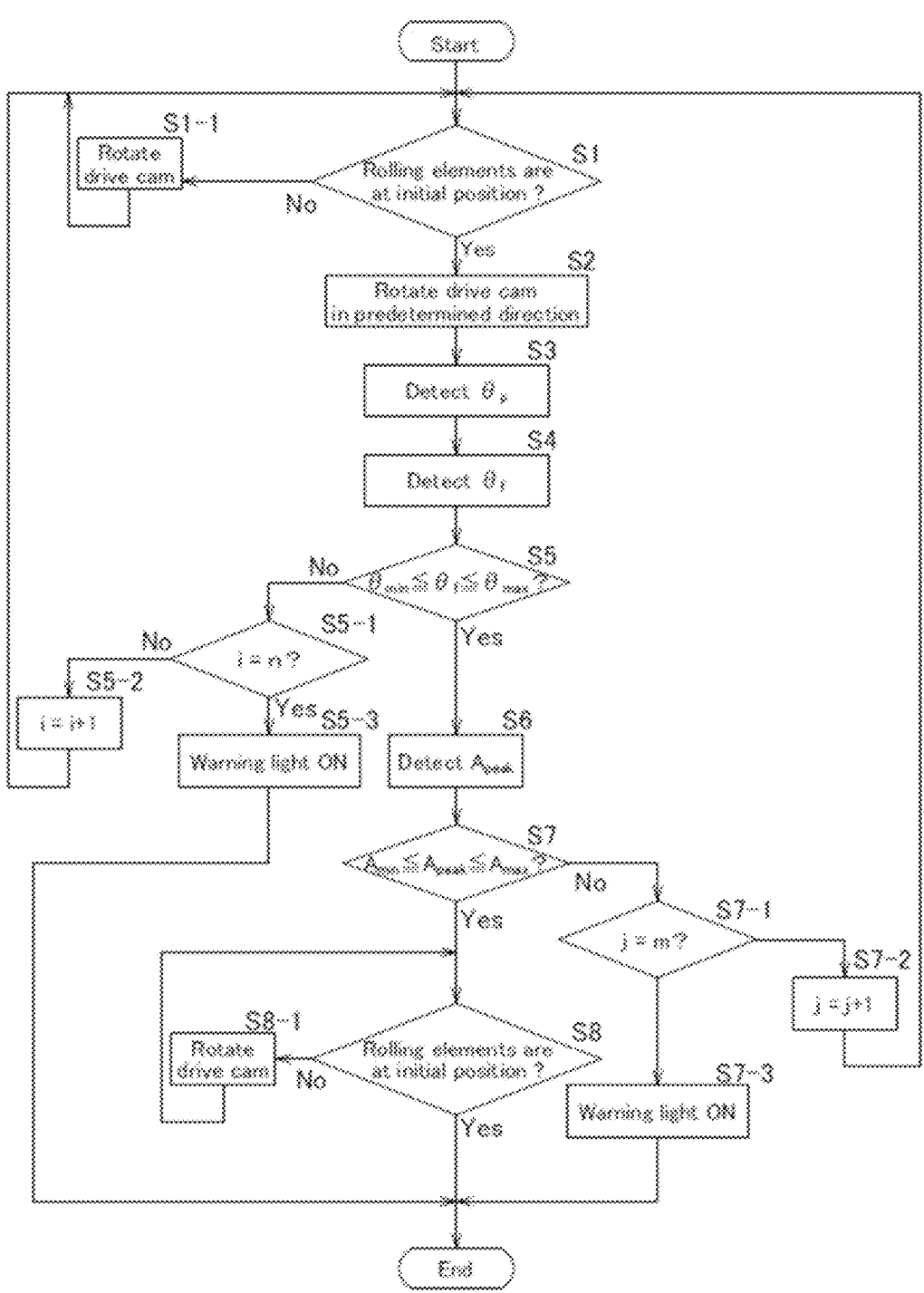
FIG. 18 is a flowchart illustrating a characteristic operation of the electric friction engagement device of the present example.

In the electric friction engagement device 7 of the present example, the function of detecting the piston touch point $\theta_p$, the function of detecting the clutch touch point $\theta_f$, and the function of detecting an abnormality are executed according to the flowchart illustrated in FIG. 18.

First, in S1, it is determined whether or not the rolling elements 36 of the cam device 28 are located at the bottom portions of the recessed portions of the drive cam surface 48, which is the initial position. This determination can be made by an arbitrary method. For example, the determination can be made based on the output value of a position sensor that detects the position in the axial direction of the driven cam 35 or the pressing member 58, or based on the number of rotational pulses generated in a Hall element or the like installed in the shift motor 66.

When it is determined in S1 that the rolling elements 36 are not located at the initial position, the process proceeds to S1-1, in which the drive cam 34 is rotated and driven by the shift motor 66 so as to move the rolling elements 36 to the initial position, and then the process returns to S1.

When it is determined in S1 that the rolling elements 36 are located at the initial position, the process proceeds to S2, in which current is applied to the shift motor 66 to start rotating and driving the drive cam 34 in the predetermined direction. The rotational speed of the drive cam 34 can be an arbitrary speed.

In S3, the current value A of the shift motor 66 is monitored, and the rotational angle θ of the drive cam 34 from the initial position when the rate of increase in the current value A becomes equal to or greater than a first threshold value is detected as a piston touch point $\theta_p$.

In S4, the current value A of the shift motor 66 is monitored, and the rotational angle θ of the drive cam 34 from the initial position when the rate of increase in the current value A becomes equal to or less than the second threshold value is detected as the clutch touch point $\theta_f$.

In S5, it is determined whether the clutch touch point $\theta_f$ is within a predetermined angle range, that is, whether it is equal to or greater than a predetermined lower limit value $\theta_{min}$ and equal to or less than a predetermined upper limit value $\theta_{max}$. When it is determined that the clutch touch point $\theta_f$ is not within the predetermined angle range, that is, is smaller than the predetermined lower limit value $\theta_{min}$ or larger than the predetermined upper limit value $\theta_{max}$, the process proceeds to S5-1, where it is determined whether the number of abnormality detections i of the clutch touch point $\theta_f$ has reached a predetermined number n set in advance.

When it is determined that the number of abnormality detections i of the clutch touch point $\theta_f$ has not reached a predetermined number n, that is, is less than n, then in S5-2, one is added to i, and the process returns to S1.

When it is determined in S5-1 that the number of abnormality detections k of the clutch touch point $\theta_f$ has reached the predetermined number n, the process proceeds to S5-3, where a warning light notifying of the abnormality is turned on, and the process proceeds to the end.

It is also possible to omit steps S5-1 and S5-2. In this case, after it is determined in S5 that the clutch touch point $\theta_f$ is not within the predetermined angle range, the process proceeds to S5-3, where a warning light notifying of an abnormality is turned on, and the process proceeds to the end.

When it is determined in S5 that the clutch touch point $\theta_f$ is within the predetermined angle range, the process proceeds to S6, where the maximum value $A_{peak}$ of the current value A of the shift motor 66 is detected.

In S7, it is determined whether the maximum value $A_{peak}$ is within a predetermined range, that is, whether it is equal to or greater than a predetermined lower limit value $A_{min}$ and equal to or less than a predetermined upper limit value $A_{max}$.

When it is determined in S7 that the maximum value $A_{peak}$ is not within the predetermined range, that is, that the maximum value $A_{peak}$ is smaller than the predetermined lower limit value $A_{min}$ or larger than the predetermined upper limit value $A_{max}$, the process proceeds to S7-1, where it is determined whether the number of abnormality detections j of the maximum value $A_{peak}$ has reached a preset predetermined number m. When it is determined that the number of abnormality detections j of the maximum value $A_{peak}$ has not reached the predetermined number m, that is, is less than m, then in S7-2, one is added to j, and the process returns to S1.

When it is determined in S7-1 that the number of abnormality detections j of the maximum value $A_{peak}$ has reached the predetermined number m, the process proceeds to S7-3, where a warning light notifying of an abnormality is turned on, and the process proceeds to the end.

In S7, when the maximum value $A_{peak}$ is within the predetermined range, it can be determined that there is no abnormality, and in the next S8, it is determined whether the rolling elements 36 are located at the bottom portions of the recessed portions of the drive cam surface 48, which is the initial position.

When it is determined in S8 that the rolling elements 36 are not located at the initial position, the process proceeds to S8-1, where the shift motor 66 rotates the drive cam 34 to move the rolling elements 36 to the initial position, and then the process returns to S8.

When it is determined in S8 that the rolling elements 36 are located at the initial position, the process proceeds to the end. Note that S8 and S8-1 may be omitted. In this case, after it is determined in S7 that the maximum value $A_{peak}$ is within he predetermined range, the process proceeds directly to the end.

With the electric friction engagement device 7 of the present example, the piston touch point $\theta_p$ and the clutch touch point $\theta_f$ can be automatically detected based on the current value A of the shift motor 66. This makes it possible to precisely control the electric friction engagement device 7 using the piston touch point $\theta_p$ and/or the clutch touch point $\theta_f$, and makes it possible to quickly detect any abnormality that occurs in the piston touch point $\theta_p$ and/or the clutch touch point $\theta_f$.

With the electric friction engagement device 7 of the present example, by determining whether the clutch touch point $\theta_f$ is within the predetermined angle range, it is possible to determine whether the wear of the first friction plate 30 and the second friction plate 31 has progressed to the limit of use. This prevents the first friction plate 30 and the second friction plate 31 from being used beyond their respective wear limits, and reliably prevents the occurrence of seizure at the friction engagement portion 26.

With the electric friction engagement device 7 of the present example, it is possible to determine whether the maximum value $A_{peak}$ of the current value A of the shift motor 66 is within the predetermined range, in other words, whether the maximum value $A_{peak}$ of the shift motor 66 is greater than or equal to the predetermined lower limit value $A_{min}$ and less than or equal to the predetermined upper limit value $A_{max}$.

When there is an abnormality such as the force elastically biasing the first friction plate 30 and the second friction plate 31 in a direction of pressing them against each other by the elastic biasing member 27, in other words, the elastic restoring force of the elastic member 33, is excessively large or the engaging state between the worm teeth of the worm 68 and the wheel teeth 49 of the drive cam 34 is improper, the maximum value $A_{peak}$ of the shift motor 66 becomes excessively large. Conversely, when the elastic restoring force of the elastic member 33 is excessively small, the force pressing the first friction plate 30 and the second friction plate 31 against each other may be insufficient, which may result in an abnormality such as the fastening force of the friction engagement portion 26 not being sufficiently secured.

The electric friction engagement device 7 of the present example has a function of determining whether the maximum value $A_{peak}$ of the current value A of the shift motor 66 is within the predetermined range. Therefore, when the abnormality as described above occurs, it can be detected quickly and the abnormality as described above can be reliably prevented from inducing further breakdown.

When the switching the mode of the electric friction engagement device 7, the output torque T of the shift motor 66 and the current value A of the shift motor 66 change with the same tendency. Therefore, in a case of carrying out the present disclosure, it is also possible to configure the electric friction engagement device 7 so as to detect the piston touch point, the clutch touch point, and even abnormalities based on the output torque of the shift motor instead of the current value of the shift motor.

However, when detecting the piston touch point, the clutch touch point, and even abnormalities based on the output torque of the shift motor, it is required to install a torque sensor, for example, on the output shaft of the shift motor.

In contrast, the electric friction engagement device 7 of the present example detects the piston touch point $\theta_p$, the clutch touch point $\theta_f$, and abnormalities based on the current value A of the shift motor 66. Therefore, there is no need to install a torque sensor just for detecting the piston touch point $\theta_p$, the clutch touch point $\theta_f$, and abnormalities, and the cost of the electric friction engagement device 7 can be reduced.

The operation illustrated in the flowchart of FIG. 18 can be performed at any timing as long as it does not interfere with the running of the automobile equipped with the two-speed transmission 1. For example, it can be implemented immediately after the ignition key is turned on or at timing such as when the two-speed transmission is switched from the low reduction ratio mode to the high reduction ratio mode like during kickdown acceleration or when the engine brake is activated.

However, in a case in which an attempt is made to implement the above operation while the automobile is running, it may not be possible to drive the drive cam 34 at an arbitrary rotational speed. In addition, if abnormalities in the clutch touch point $\theta_f$ or the maximum value $A_{peak}$ are detected and the operation returns to S1 for re-evaluation, this can cause problems such as making acceleration less smooth. Therefore, it is preferable that the above operation is performed while the automobile is stopped, such as immediately after the ignition key is turned on.

Each step of the flowchart illustrated in FIG. 18 can be changed in order or performed simultaneously as long as there is no contradiction. For example, while monitoring the current value A of the shift motor 66, steps S4 to S5 and steps S6 to S7 can be carried out in parallel at the same time. For example, steps S4 to S5 and steps S6 to S7 can be performed in parallel at the same time while monitoring the current value A of the shift motor 66.

With the two-speed transmission 1 of the present example, it is possible to ensure good torque transmission efficiency. The reason for this will be explained in the following.

When the cam device 28 is in a state of generating a pressing force, that is, a state in which the driven cam 35 presses the piston 32 toward the one side in the axial direction through the thrust bearing 57 and the pressing member 58 (the state illustrated in FIG. 2B), a force directed toward the one side in the axial direction is applied to the thrust bearing 57. In addition, a reaction force caused by the driven cam 35 pressing the piston 32 toward the one side in the axial direction is applied to the radial bearing 38 toward the other side in the axial direction through the rolling elements 36 and the drive cam 34.

The raceway ring 59*a* on the one side in the axial direction of the thrust bearing 57 is supported by the rotating member 6 through the pressing member 58 and the piston 32, and the raceway ring 59*b* on the other side in the axial direction is supported by the fixed portion 10 through the cam device 28, the angular ball bearing 39, and the tubular member 37. In addition, the inner ring 42 of the radial bearing 38 is externally fitted and fixed to the rotating member 6, and the outer ring 43 is supported by the drive cam 34 of the cam device 28 through the tubular member 37 and the angular ball bearing 39.

In the two-speed transmission 1 of the present example, when the cam device 28 is in a state of generating a pressing force, that is, in a state in which the piston 32 is pressed toward the one side in the axial direction, the axial dimension of the elastic member 33 elastically contracts, and the force pressing the first friction plate 30 and the second friction plate 31 against each other is released and the electric friction engagement device 7 is disconnected, the brake device 8 is connected. In the high reduction ratio mode in which the electric friction engagement device 7 is disconnected and the brake device 8 is connected, the relative rotation of the rotating member 6 with respect to the fixed portion 10 is prevented.

In this state, the raceway ring 59*a* on the one side in the axial direction and the raceway ring 59*b* on the other side in the axial direction of the thrust bearing 57 do not rotate relative to each other, and the inner ring 42 and the outer ring 43 of the radial bearing 38 do not rotate relative to each other. In short, in a state in which a force in the axial direction (left and right direction in FIG. 2B) is applied to the thrust bearing 57 and the radial bearing 38 and the rolling resistance becomes large, the raceway ring 59*a* on the one side in the axial direction and the raceway ring 59*b* on the other side in the axial direction of the thrust bearing 57 do not rotate relative to each other, and the inner ring 42 and the outer ring 43 of the radial bearing 38 do not rotate relative to each other.

Therefore, torque loss in the thrust bearing 57 and the radial bearing 38 can be prevented.

The pressing force generated by the cam device 28 is applied from the driven cam 35 through the pressing member 58, the thrust bearing 57, the piston 32, and the elastic member 33 to the rotating member 6 in a direction toward the one side in the axial direction. In response to this, the reaction force generated by the cam device 28 generating the pressing force is applied from the drive cam 34 through the radial bearing 38 to the rotating member 6 in a direction toward the other side in the axial direction. In this way, the forces in the axial direction generated by the cam device 28 generating the pressing force are cancelled out within the rotating member 6.

On the other hand, when the brake device 8 is disconnected and relative rotation of the rotating member 6 with respect to the fixed portion 10 is allowed (the state illustrated in FIG. 2A), the electric friction engagement device 7 is connected and the cam device 28 does not generate a pressing force. In this state, no force in the axial direction (left and right direction in FIG. 2A) is applied to the thrust bearing 57 and the radial bearing 38 due to the pressing force generated by the cam device 28, so the rolling resistance of the thrust bearing 57 and the radial bearing 38 does not become unnecessarily large, and torque loss does not become excessively large.

In short, in the two-speed transmission 1 of the present example, except for a short period of time during mode switching, the thrust bearing 57 and the radial bearing 38 do not rotate in a state where the force in the axial direction caused by the pressing force generated by the cam device 28 is applied and the rolling resistance becomes large. Therefore, it is possible to prevent excessive torque loss from occurring in the thrust bearing 57 and the radial bearing 38, and the torque transmission efficiency of the two-speed transmission 1 can be ensured favorably.

The friction engagement device of the present invention can be incorporated and used not only in two-speed transmissions for automobiles, but also between a pair of rotating members of various structures, or between a rotating member and a fixed member.

REFERENCE SIGNS LIST

1 Two-speed transmission
2 Drive source
3 Differential device
4 Input member
5 Output member
6 Rotating member
7 Electric friction engagement device
8 Brake device
9 Planetary reduction mechanism
10 Fixed portion
11 Output shaft
12 Drive gear
13 Input gear
14 Output gear
15 Small diameter flange portion
16 Flange portion
17 Through holes
18 First circular ring portion
19 First cylindrical portion
20 Second circular ring portion
21 Second cylindrical portion
22 Shaft member
23 Stepped cylindrical member
24 Small diameter cylindrical portion
25 Female spline portion
26 Friction engagement portion
27 Elastic biasing member
28 Cam device
29 Electric actuator
30 First friction plate
31 Second friction plate
32 Piston
33 Elastic member
34 Drive cam
35 Driven cam
36 Rolling elements
37 Tubular member
38 Radial bearing
39 Angular ball bearing
40 Cylindrical portion
41 Outward-facing flange portion
42 Inner ring
43 Outer ring 44 Rolling elements
45 Inner ring
46 Outer ring
47 Balls
48 Drive cam surface
49 Wheel teeth
50 Pin portions
51 Female spline portion
52 Male spline portion
53 Rectangular hole
54a, 54b Support plate portion
55 Support hole
56 Support recessed portion
57 Thrust bearing
58 Pressing member
59a, 59b Raceway rings
60 Rolling elements
61 Preload applying means
62 Base portion
63 Partial cylindrical portion
64 Support shaft
65 Rollers
66 Shift motor
67 Reducer
68 Worm
69a, 69b Support bearing
70 Outer diameter side cylindrical member
71 Inner diameter side cylindrical member
72 Selection plate
73 outer peripheral side uneven portion
74 Sun gear
75 Ring gear
76 Carrier
77 Planetary gear
78 Return spring

The invention claimed is:

1. An electric friction engagement device, comprising:
a first member;
a second member supported coaxially with the first member and supported so as to be capable of rotating relative to the first member;
a friction engagement portion having at least one first friction plate and at least one second friction plate supported to be capable of relative displacement in an axial direction, and is provided between the first member and the second member so that the friction engagement portion switches to a state in which torque is transmitted between the first member and the second member by pressing the first friction plate and the second friction plate against each other, and switches to a state in which torque is not transmitted between the first member and the second member by releasing the force pressing the first friction plate and the second friction plate against each other;
an elastic biasing member provided between the first member and the friction engagement portion, and elastically biases the first friction plate and the second friction plate in a direction of pressing the first friction plate and the second friction plate against each other;
a cam device having a drive cam supported so as to be capable of rotating relative to the first member and the second member but not to be capable of displacement in the axial direction, and a driven cam supported so as to be capable of rotating relative to the drive cam and to be capable of displacement in the axial direction, and as the drive cam rotates, the cam device pressing the elastic biasing member in a direction of releasing the force pressing the first friction plate and the second friction plate against each other based on the driven cam moving in a direction of widening a distance in the axial direction between the driven cam and the drive cam; and
an electric actuator having a shift motor and a reducer, and rotating and driving the drive cam by the shift motor through the reducer;
the electric friction engagement device having:
a function of detecting that a phase in a rotational direction of the drive cam when an output torque or current value of the shift motor begins to increase at a rate of increase equal to or greater than a first predetermined threshold value is at a piston touch point at which the elastic biasing member begins to be pressed in the direction of releasing the force pressing the first friction plate and the second friction plate against each other when the drive cam is rotated and driven by the shift motor through the reducer in order to switch the friction engagement portion from the state in which torque is transmitted between the first member and the second member to the state in which torque is not transmitted between the first member and the second member; and
a function of detecting that a phase in the rotational direction of the drive cam when the rate of increase becomes equal to or less than a second predetermined threshold value after exceeding the piston touch point is at a clutch touch point at which the force pressing the first friction plate and the second friction plate against each other becomes zero when the drive cam is rotated and driven by the shift motor through the reducer in order to switch the friction engagement portion from the state in which torque is transmitted between the first member and the second member to the state in which torque is not transmitted between the first member and the second member.

2. The electric friction engagement device according to claim 1, comprising a function of determining whether the piston touch point or the clutch touch point is within a predetermined angle range.

3. The electric friction engagement device according to claim 1, comprising a function of determining whether a maximum value of the output torque or current value of the shift motor is within a predetermined range when the drive cam is rotated and driven by the shift motor through the reducer in order to switch the friction engagement portion from the state in which torque is transmitted between the first member and the second member to the state in which torque is not transmitted between the first member and the second member.

4. The electric friction engagement device according to claim 1, wherein
the elastic biasing member has a piston supported so as to be capable of displacement in the axial direction relative to the first member, and an elastic member provided between the first member and the piston.

5. A method for detecting touch point for an electric friction engagement device, the electric friction engagement device comprising:
a first member;
a second member supported coaxially with the first member and supported so as to be capable of rotating relative to the first member;
a friction engagement portion having at least one first friction plate and at least one second friction plate supported to be capable of relative displacement in an axial direction, and is provided between the first member and the second member so that the friction engagement portion switches to a state in which torque is transmitted between the first member and the second member by pressing the first friction plate and the second friction plate against each other, and switches to a state in which torque is not transmitted between the first member and the second member by releasing the force pressing the first friction plate and the second friction plate against each other;

an elastic biasing member provided between the first member and the friction engagement portion, and elastically biases the first friction plate and the second friction plate in a direction of pressing the first friction plate and the second friction plate against each other;

a cam device having a drive cam supported so as to be capable of rotating relative to the first member and the second member but not to be capable of displacement in the axial direction, and a driven cam supported so as to be capable of rotating relative to the drive cam and to be capable of displacement in the axial direction, and as the drive cam rotates, the cam device pressing the elastic biasing member in a direction of releasing the force pressing the first friction plate and the second friction plate against each other based on the driven cam moving in a direction of widening a distance in the axial direction between the driven cam and the drive cam; and an electric actuator having a shift motor and a reducer, and rotating and driving the drive cam by the shift motor through the reducer;

the method having:

a step of detecting that a phase in a rotational direction of the drive cam when an output torque or current value of the shift motor begins to increase at a rate of increase equal to or greater than a first predetermined threshold value is at a piston touch point at which the elastic biasing member begins to be pressed in the direction of releasing the force pressing the first friction plate and the second friction plate against each other when the drive cam is rotated and driven by the shift motor through the reducer in order to switch the friction engagement portion from the state in which torque is transmitted between the first member and the second member to the state in which torque is not transmitted between the first member and the second member; and a step of detecting that a phase in the rotational direction of the drive cam when the rate of increase becomes equal to or less than a second predetermined threshold value after exceeding the piston touch point is at a clutch touch point at which the force pressing the first friction plate and the second friction plate against each other becomes zero when the drive cam is rotated and driven by the shift motor through the reducer in order to switch the friction engagement portion from the state in which torque is transmitted between the first member and the second member to the state in which torque is not transmitted between the first member and the second member.

6. A method for detecting abnormality of the electric friction engagement device, the electric friction engagement device comprising:

a first member;

a second member supported coaxially with the first member and supported so as to be capable of rotating relative to the first member;

a friction engagement portion having at least one first friction plate and at least one second friction plate supported to be capable of relative displacement in an axial direction, and is provided between the first member and the second member so that the friction engagement portion switches to a state in which torque is transmitted between the first member and the second member by pressing the first friction plate and the second friction plate against each other, and switches to a state in which torque is not transmitted between the first member and the second member by releasing the force pressing the first friction plate and the second friction plate against each other;

an elastic biasing member provided between the first member and the friction engagement portion, and elastically biases the first friction plate and the second friction plate in a direction of pressing the first friction plate and the second friction plate against each other;

a cam device having a drive cam supported so as to be capable of rotating relative to the first member and the second member but not to be capable of displacement in the axial direction, and a driven cam supported so as to be capable of rotating relative to the drive cam and to be capable of displacement in the axial direction, and as the drive cam rotates, the cam device pressing the elastic biasing member in a direction of releasing the force pressing the first friction plate and the second friction plate against each other based on the driven cam moving in a direction of widening a distance in the axial direction between the driven cam and the drive cam; and an electric actuator having a shift motor and a reducer, and rotating and driving the drive cam by the shift motor through the reducer;

wherein the method having a step of performing the method for detecting touch point for the electric friction engagement device according to claim 5, and a step of determining whether the piston touch point or the clutch touch point is equal to or greater than a predetermined angle.

7. The method for detecting abnormality of the electric friction engagement device according to claim 6, comprising:

a step of determining whether a maximum value of the output torque or current value of the shift motor is within a predetermined range when the drive cam is rotated and driven by the shift motor through the reducer in order to switch the friction engagement portion from the state in which torque is transmitted between the first member and the second member to the state in which torque is not transmitted between the first member and the second member.

* * * * *